United States Patent
Kuroiwa

(10) Patent No.: US 10,113,621 B2
(45) Date of Patent: Oct. 30, 2018

(54) METHOD FOR MANUFACTURING BALL SCREW AND BALL SCREW

(71) Applicant: NSK Ltd., Shinagawa-ku, Tokyo (JP)

(72) Inventor: Daisuke Kuroiwa, Ukiha (JP)

(73) Assignee: NSK Ltd., Tokyo (JP)

( * ) Notice: Subject to any disclaimer, the term of this patent is extended or adjusted under 35 U.S.C. 154(b) by 296 days.

(21) Appl. No.: 15/202,225

(22) Filed: Jul. 5, 2016

(65) Prior Publication Data

US 2016/0312868 A1    Oct. 27, 2016

Related U.S. Application Data

(62) Division of application No. 14/351,014, filed as application No. PCT/JP2012/006495 on Oct. 10, 2012.

(30) Foreign Application Priority Data

| Oct. 12, 2011 | (JP) | ................................. 2011-225111 |
| Oct. 18, 2011 | (JP) | ................................. 2011-228920 |
| Oct. 24, 2011 | (JP) | ................................. 2011-232988 |

(51) Int. Cl.
    *F16H 25/24*      (2006.01)
    *F16H 25/22*      (2006.01)

(52) U.S. Cl.
    CPC ..... *F16H 25/2418* (2013.01); *F16H 25/2204* (2013.01); *F16H 2025/2481* (2013.01);
(Continued)

(58) Field of Classification Search
    CPC .................................................. F16H 25/2418
    See application file for complete search history.

(56) References Cited

U.S. PATENT DOCUMENTS

| 2,757,548 A | 8/1956 | Smith et al. |
| 4,053,167 A | 10/1977 | Jelinek |
| (Continued) | | |

FOREIGN PATENT DOCUMENTS

| CN | 2597761 Y | 1/2004 |
| EP | 1 452 256 A1 | 9/2004 |
| (Continued) | | |

OTHER PUBLICATIONS

Corresponding International Search Report with English Translation dated Nov. 27, 2012 (four (4) pages).
(Continued)

*Primary Examiner* — Terence Boes
(74) *Attorney, Agent, or Firm* — Crowell & Moring LLP

(57) ABSTRACT

A method for manufacturing a ball screw according to the present invention includes a seal fixing step of fixing a ring shaped seal to an attachment portion disposed in an end portion of a nut of a ball screw in an axis direction using a fixing member. The attachment portion has an inner circumferential surface having a diameter larger than that of an inner circumferential surface on which a spiral groove of the nut is formed. A through hole is formed in the attachment portion, the through hole penetrating the attachment portion in a radial direction from an outer circumferential surface thereof to the inner circumferential surface thereof. The seal fixing step includes passing the screw through the through hole and engaging the screw with an outer circumferential portion of the ring shaped seal to exert an outward-directed force in the radial direction on the ring shaped seal because of a force of the head pressing the bearing face to fix the ring shaped seal to the nut.

1 Claim, 26 Drawing Sheets

(52) U.S. Cl.
CPC .... *Y10T 29/49826* (2015.01); *Y10T 29/49963* (2015.01); *Y10T 74/19744* (2015.01)

(56) References Cited

U.S. PATENT DOCUMENTS

| | | |
|---|---|---|
| 4,604,911 A | 8/1986 | Teramachi |
| 4,841,796 A | 6/1989 | Teramachi |
| 4,881,419 A | 11/1989 | Weyer |
| 4,905,533 A | 3/1990 | Benton et al. |
| 5,178,029 A | 1/1993 | Klinkenberg |
| 5,228,353 A | 7/1993 | Katahira et al. |
| 5,520,491 A | 5/1996 | Miyagawa |
| 5,555,771 A | 9/1996 | Kuroiwa et al. |
| 6,178,839 B1 | 1/2001 | Yoshida et al. |
| 6,216,821 B1 | 4/2001 | Namimatsu et al. |
| 6,450,295 B1 | 9/2002 | Tsukada et al. |
| 6,578,852 B2 | 6/2003 | Nakagawa |
| 6,588,289 B2 | 7/2003 | Ung et al. |
| 2002/0023512 A1 | 2/2002 | Tsukada et al. |
| 2004/0089476 A1 | 5/2004 | Uchino et al. |
| 2006/0076214 A1* | 4/2006 | Yang ............ F16H 25/2418 198/468.9 |
| 2007/0227278 A1 | 10/2007 | Tsou et al. |

FOREIGN PATENT DOCUMENTS

| | | |
|---|---|---|
| JP | 4-93548 U | 8/1992 |
| JP | 2001-280320 A | 10/2001 |
| JP | 2002-349664 A | 12/2002 |
| JP | 2003-62827 A | 3/2003 |
| JP | 2003-97668 A | 4/2003 |
| JP | 2007-255661 A | 10/2007 |
| JP | 3141314 U | 4/2008 |
| JP | 2010-12561 A | 1/2010 |
| JP | 4421732 B2 | 2/2010 |

OTHER PUBLICATIONS

Japanese-language Written Opinion dated Nov. 27, 2012 (PCT/ISA/237) (three (3) pages).

International Preliminary Report on Patentability (PCT/IB/338 and PCT/IB/373) dated Apr. 24, 2014, including English translation of document C2 (Japanese-language Written Opinion (PCT/ISA/237)) dated Apr. 10, 2014 (six (6) pages).

Taiwanese Office Action dated Aug. 13, 2014, with English translation (Seven (7) pages).

Japanese Office Action dated Sep. 9, 2014, with English translation (Four (4) pages).

Korean Office Action dated Jan. 30, 2015 with partial English translation (five pages).

Chinese Office Action issued in counterpart Chinese Application No. 201280050217.2 dated Oct. 9, 2015, with English translation (Twelve (12) pages).

* cited by examiner

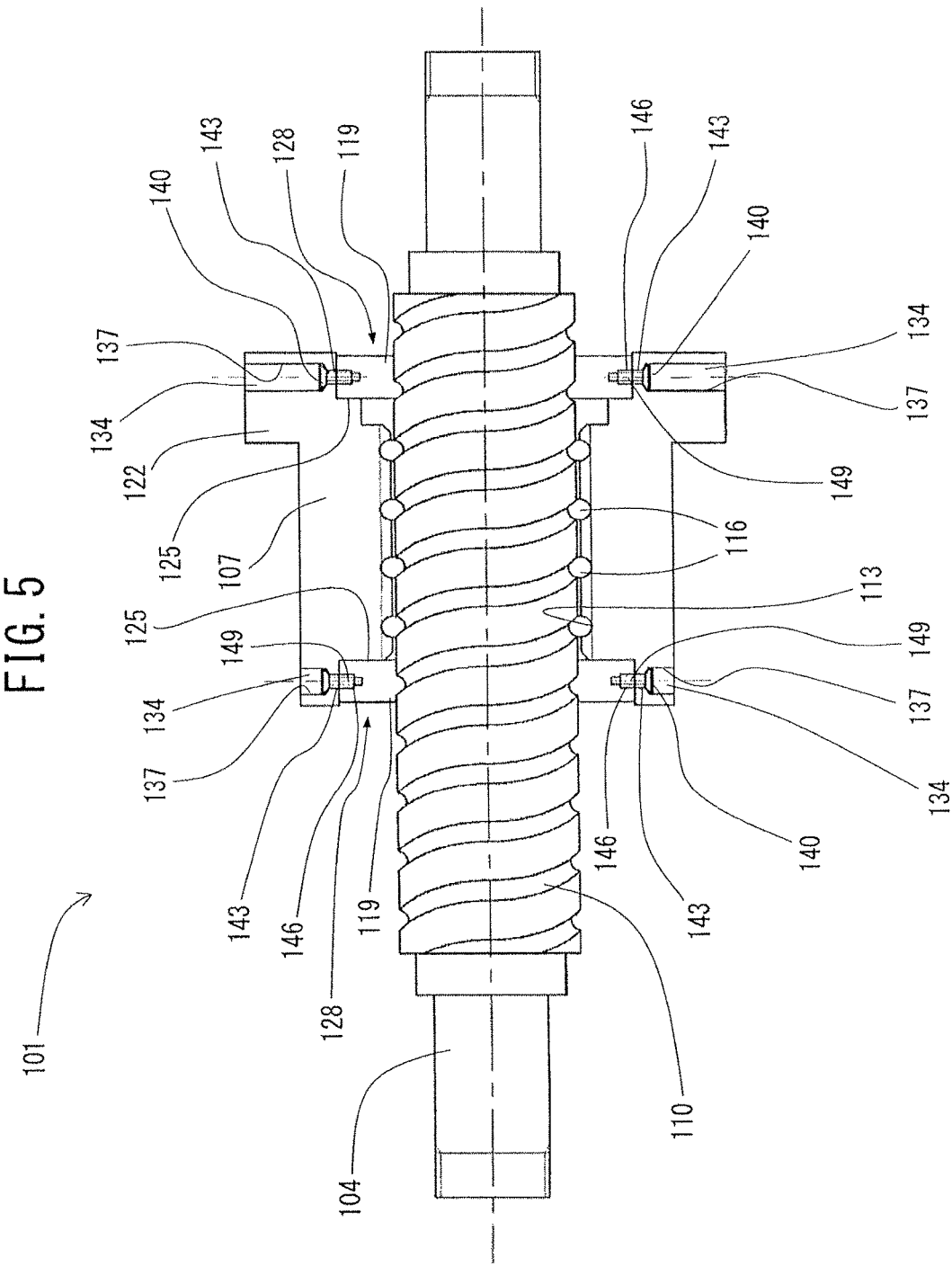

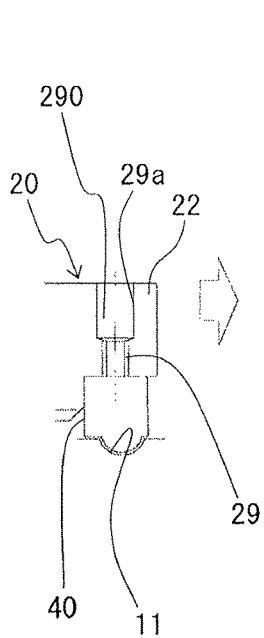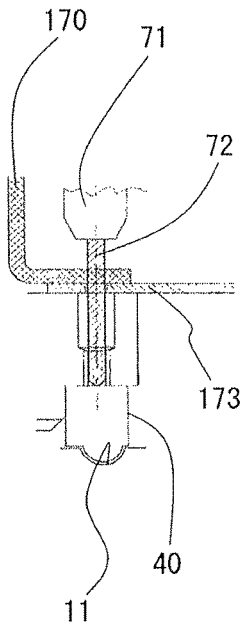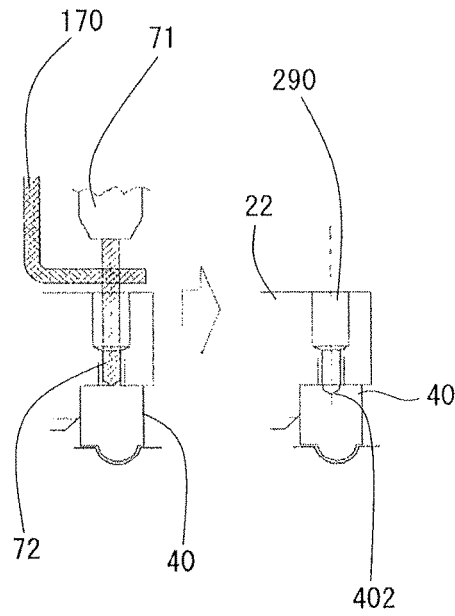
FIG. 27A  FIG. 27B  FIG. 27C  FIG. 27D

METHOD FOR MANUFACTURING BALL SCREW AND BALL SCREW

CROSS REFERENCE TO RELATED APPLICATIONS

This application is a divisional of U.S. application Ser. No. 14/351,014, filed Apr. 10, 2014, which is a 371 of International Application No. PCT/JP2012/006495, filed Oct. 10, 2012, which claims priority from Japanese Patent Application Nos. 2011-232988, filed Oct. 24, 2011, 2011-228920, filed Oct. 18, 2011, and 2011-225111, filed Oct. 12, 2011, the disclosures of which are expressly incorporated by reference herein.

TECHNICAL FIELD

The present invention relates to a ball screw used as a mechanical element of a steering apparatus, a heavy load conveying apparatus, a processing machine, a precise positioning apparatus, and the like and a method for manufacturing thereof.

BACKGROUND ART

A ball screw (ball screw apparatus) includes a nut having a spiral groove formed on the inner circumferential surface thereof, a threaded shaft having a spiral groove formed on the outer circumferential surface thereof, balls allocated in a raceway formed by the spiral groove of the nut and the spiral groove of the threaded shaft, and a ball returning passage for returning the balls from an end point of the raceway to a start point thereof, and in which the balls roll in the raceway, thereby ensuring that the nut moves relative to the threaded shaft.

In using such a ball screw, a lubricant is supplied inside the nut. When foreign matters such as dust or abrasion powder attached to the threaded shaft enter the nut, the foreign matters cause damage such as seizure of the balls or the spiral grooves. Thus, it is necessary to prevent the entry of the foreign matters into the nut. Accordingly, in order to prevent discharging of the lubricant supplied inside the nut to the outside and to prevent the entry of the foreign matters into the nut, a ring shaped seal (dust-proof component) is attached to end portions of the nut in the axis direction.

A conventional example (FIG. 4 of PTL 1) of a ball screw having a seal is illustrated in FIG. 24. In the ball screw, a ring shaped seal 40 is fixed to the inner circumferential surface of an end portion of a nut 20 in the axis direction by the use of a set screw 60 not having a head.

A method for fixing seal used in the ball screw will be described below with reference to FIGS. 25A to 25C.

First, a through hole 28 is formed in an end portion of the nut 20 in the axis direction using a drill or the like. FIG. 25A illustrates this state. Then, the through hole 28 is threaded so as to form a female screw hole 29. FIG. 25B illustrates this state. Then, the drill is made to pass through the female screw hole 29 to form a pilot hole 402 on the outer circumferential surface of a seal 40 in a state where the outer circumferential surface of the seal 40 is fitted into the inner circumferential surface of the nut 20. FIG. 25C illustrates this state.

Then, the seal 40 is fixed to the nut 20 by screwing a set screw 60 into the female screw hole 29 of the nut 20 and inserting the shaft portion of the tip of the set screw 60 into the pilot hole 402 of the seal 40. In this seal fixing method, a step of threading the through hole 28, a step of removing burrs thereafter, or the like is necessary.

A flange may be formed on the end portion in the axis direction as a seal attaching portion of the nut 20 to which the seal is attached, may not be formed thereon as with the end portion illustrated in FIG. 24. The thickness (size in the radial direction) of the seal attaching portion of the nut varies by products, because the outer diameter of the nut and the outer diameter of the flange are determined depending on customer requirements.

As illustrated in FIG. 26A, when the wall thickness TN of the seal attaching portion of the nut 20 is small, only the female screw hole 29 is formed in the seal attaching portion. As illustrated in FIG. 26B, when the wall thickness TN of the seal attaching portion of the nut 20 is large, the time required for a tapping operation is shortened by forming a drilled hole 29a on the outer circumference thereof.

The production lot of a ball screw is small and the ball screws have various sizes. Accordingly, the formation of the pilot hole 402 of the seal 40 and the through hole 28 and the drilled hole 29a of the nut 20 is carried out using a manual drilling machine without using a dedicated tool. In formation of the pilot hole 402, operations illustrated in FIGS. 27A to 27D are carried out to make the depths of the pilot holes 402 constant.

These operations will be described below with reference to a nut having a flange formed in one end portion in the axis direction and not having a flange formed in the other end portion. In this example, as illustrated in FIG. 27A, in one end portion of the nut 20 in the axis direction, a through hole 290 including an female screw hole 29 and a drilled hole 29a is formed in a flange 22.

First, as illustrated in FIG. 27B, a drill 71 not rotating is inserted into the through hole 290 until the tip of a drill bit 72 reaches the outer circumferential surface of the seal 40, and a stopper 170 for restraining forward movement of the drill 71 is attached to the drill 71.

Then, a gauge 173 having the same thickness as the depth of a pilot hole 402 to be formed in the seal 40 is disposed on the outer circumferential surface of the nut 20 around or in the vicinity of the drill bit 72, and the stopper 170 is set on the gauge 173 so as to come in contact with the gauge. Thereafter, as illustrated in FIG. 27C, the gauge 173 is extracted and the drill bit 72 is rotationally driven to form the pilot hole 402 by a drilling machining. The drill 71 drills the seal 40 from the outer circumferential surface to the inside until the forward movement thereof is restrained by the stopper 170.

Through this machining process, the pilot hole 402 is formed in the seal 40 as illustrated in FIG. 27D. By forming the respective pilot holes 402 through this machining process, the pilot holes 402 having the same depth as the thickness of the gauge can be always formed on the outer circumferential surface of the seal 40. That is, the depths of the pilot hole 402 to be formed can be managed.

This operation is carried out on the other end portion of the nut 20 in the axis direction. Since a flange is not formed in the other end portion of the nut 20 in the axis direction, only a female screw hole 29 is formed therein. The above mentioned operation is carried out by considering the female screw hole 29 as the through hole 290. The adjustment of the depth of the pilot hole 402 using the gauge 173 and the stopper 170 is carried out in correspondence with the thickness of the seal attaching portion of the nut 20.

CITATION LIST

Patent Literature

PTL 1: JP 2002-349664 A

SUMMARY OF INVENTION

Technical Problem

In the method for fixing the seal according to the above related art, when the set screw is fastened excessively strong, the seal may be pressed against the threaded shaft and the friction between the seal and the threaded shaft will increase to generate heat. This generation of heat may cause expansion of the threaded shaft and thus needs to be prevented.

An object of the present invention is to prevent heat from being generated due to friction between a seal and a threaded shaft in a seal fixing process of fixing a ring shaped seal to an attachment portion disposed in an end portion of a nut in the axis direction using a fixing member.

Solution to Problem

In order to achieve the above-mentioned object, according to a first aspect of the present invention, there is provided a method for manufacturing a ball screw, the method including a seal fixing step of fixing a ring shaped seal to an attachment portion disposed in an end portion of a nut of the ball screw in an axis direction using a fixing member, and having the following configurations of (1-1) and (1-2).

(1-1) The attachment portion has an inner circumferential surface having a diameter larger than a diameter of an inner circumferential surface on which a spiral groove of the nut is formed, and a through hole is formed in the attachment portion, the through hole penetrating the attachment portion in a radial direction from an outer circumferential surface of the attachment portion to the inner circumferential surface of the attachment portion.

(1-2) The seal fixing step includes passing the fixing member through the through hole and engaging the fixing member with an outer circumferential portion of the ring shaped seal to exert an outward-directed force in the radial direction on the ring shaped seal and to fix the ring shaped seal to the nut.

According to a second aspect of the present invention, there is provided a method for manufacturing a ball screw, the method including a seal fixing step of fixing a ring shaped seal to an attachment portion disposed in an end portion of a nut of the ball screw in an axis direction using a fixing member, and having the above-mentioned configuration of (1-1) and the following configurations of (1-3) to (1-5).

(1-3) A screw having a head is used as the fixing member.

(1-4) The through hole has a bearing face for bearing the head of the screw.

(1-5) The seal fixing step includes passing the screw through the through hole and engaging the screw with an outer circumferential portion of the ring shaped seal to exert an outward-directed force in the radial direction on the ring shaped seal because of a force of the head pressing the bearing face to fix the ring shaped seal to the nut.

The method for manufacturing the ball screw according to the second aspect may further have the following configuration of (1-6).

(1-6) The an attachment hole is formed in the ring shaped seal, the attachment hole extending in the radial direction from the outer circumferential surface of the ring shaped seal, and the seal fixing step includes matching positions of the attachment hole and the through hole with each other, and passing the screw through the through hole to engage the screw with the attachment hole.

When the method for manufacturing the ball screw according to the second aspect has the above-mentioned configuration of (1-6) and the following configurations (1-7) and (1-8), it is preferable that the method for manufacturing the ball screw have the following configurations of (1-9) and (1-10).

(1-7) The attachment hole is a concave portion extending in the radial direction from the outer circumferential surface of the ring shaped seal.

(1-8) The through hole includes a large-diameter portion on an outer circumference side, a small-diameter portion on an inner circumference side, and a conical portion communicating between the large-diameter portion and the small-diameter portion, a diameter of the large-diameter portion being larger than a diameter of the head of the screw, a diameter of the small-diameter portion being larger than an outer diameter of a male screw portion of the screw, and an inclined surface of the conical portion serving as the bearing face for bearing the head.

(1-9) A drill having a bit portion at a tip of a shank portion of the drill and an inclined surface formed in a boundary portion between the shank portion and the bit portion is used, the inclined surface corresponding the inclined surface of the through hole, a diameter of the bit portion being smaller than a diameter of the shank portion, the diameter of the shank portion being larger than the diameter of the small-diameter portion of the through hole and smaller than the diameter of the large-diameter portion.

(1-10) The ring shaped seal is disposed in the attachment portion, and the concave portion formed in the ring shaped seal by inserting the drill into the through hole until a position where the inclined surface of the shank portion comes in contact with the inclined surface of the through hole.

According to a third aspect of the present invention, there is provided a ball screw having the following configurations of (1-11) to (1-13).

(1-11) The ball screw includes: a nut having an inner circumferential surface on which a spiral groove is formed; a threaded shaft having an outer circumferential surface on which a spiral groove is formed; balls allocated in a raceway formed by the spiral groove of the nut and the spiral groove of the threaded shaft; a ring shaped seal fixed to an attachment portion disposed in an end portion of the nut in an axis direction; and a screw having a head.

(1-12) The attachment portion has an inner circumferential surface having a diameter larger than a diameter of the inner circumferential surface on which the spiral groove of the nut is formed, a through hole is formed in the attachment portion, the through hole penetrating the attachment portion in a radial direction from an outer circumferential surface of the attachment portion to the inner circumferential surface of the attachment portion, and the through hole has a bearing face for bearing the head of the screw.

(1-13) The screw passes through the through hole and engages with an outer circumferential portion of the ring shaped seal to exert an outward-directed force in the radial direction on the ring shaped seal because of a force of the head pressing the bearing face to fix the ring shaped seal to the nut.

In the ball screw according to the third aspect, a fastening torque of the screw varies when the outer circumferential surface of the seal comes in contact with the attachment portion of the nut to exert the outward-directed force in the radial direction on the ring shaped seal while the screw engages with the outer circumferential portion of the ring shaped seal. Since the state of fixation of the ring shaped seal to the nut can be recognized by the use of the variation, it is possible to determine that the fixation of the ring shaped seal to the nut is completed by managing the fastening torque of the screw.

The engagement in the first to third aspects includes the coupling based on the male screw portion of the tapping screw or the self-drill screw in a state the male screw portion cuts a thread, the screwing of the female screw and the male screw, or the like.

The ball screw according to the third aspect may have the following configurations of (1-14) or (1-15).

(1-14) The screw is a tapping screw, the ring shaped seal has an attachment hole at a position corresponding to the through hole, the attachment hole extending in the radial direction from an outer circumferential surface of the ring shaped seal, the attachment hole is a pilot hole of which a hole diameter is equal to or less than a root diameter of a male screw portion of the tapping screw and in which a female screw is not formed, and the male screw portion of the tapping screw passing through the through hole is coupled to a portion of the pilot hole of the ring shaped seal in a state the male screw portion cuts a thread.

(1-15) The screw is a self-drill screw, and a male screw portion of the self-drill screw passing through the through hole is coupled to the outer circumferential portion of the ring shaped seal in a state the male screw portion cuts a thread.

Fourth and Fifth Aspects

According to a fourth aspect of the present invention, there is provided a method for manufacturing a ball screw apparatus, the ball screw having the following configurations of (2-1) and (2-2), and the method having the following configurations of (2-3) to (2-5).

(2-1) The ball screw apparatus includes a threaded shaft having an outer circumferential surface on which a spiral groove is formed, a nut having an inner circumferential surface on which a groove is formed, the groove facing the spiral groove, the nut engaging with the threaded shaft via plural rolling elements allocated between the groove and the spiral groove and a dust-proof component disposed in an inner diameter side of the nut and sealing a gap between the nut and the threaded shaft.

(2-2) Plural through holes in the radial direction are formed in an end portion of the nut in an axis direction, the plural through holes penetrating the nut from the outer circumferential surface of the nut to the inner circumferential surface of the nut, fixing members for fixing the dust-proof component to the nut is disposed in respective the plural through holes, and plural concave portions is formed on the outer circumferential surface side of the dust-proof component, the plural concave portions engaging with the fixing members corresponding to the plural through holes.

(2-3) The through holes are formed so as to have a large-diameter portion having a diameter larger than the diameter of the fixing member on the outer circumferential surface side of the nut, a small-diameter portion engaging with the fixing member on the inner circumferential surface side of the nut, and a stepped portion between the large-diameter portion and the small-diameter portion.

(2-4) The plural concave portions are formed by the use of a drill which includes a shank portion and a bit portion disposed at a tip of the shank portion and in which the bit portion has a diameter smaller than that of the shank portion and the shank portion has a diameter larger than that of the small-diameter portion and smaller than that of the large-diameter portion.

(2-5) The drill is inserted into the through hole up to a position at which the shank portion comes in contact with the stepped portion of the through hole at the time of forming the concave portions.

In the method for manufacturing the ball screw apparatus according to the fourth aspect, preferably, the stepped portion restrains forward movement of the drill by contact between the shank portion and the stepped portion at the time of forming the concave portions, and the processing distance of the drill on the dust-proof component is defined so that the depths of all of the plural concave portions after being formed are identical.

In the method for manufacturing the ball screw apparatus according to the fourth aspect, preferably, the through holes are formed so that the depths of all of the small-diameter portions in the through holes are identical.

In the method for manufacturing the ball screw apparatus according to the fourth aspect, preferably, the plural concave portions are formed using the drill having the bit portion of which the length is equal to the total sum of the depth of the small-diameter portion and the depth of the concave portion after being formed.

The drill used for performing the method for manufacturing the ball screw apparatus according to the fourth aspect preferably includes a shank portion and a bit portion disposed at a tip of the shank portion, in which the bit portion has a diameter smaller than that of the shank portion and the shank portion has a diameter larger than that of the small-diameter portion and smaller than that of the large-diameter portion.

In the drill used for performing the method for manufacturing the ball screw apparatus according to the fourth aspect, preferably, the length of the bit portion is equal to the total sum of the depth of the small-diameter portion and the depth of the concave portion after being formed.

According to the fourth aspect, it is possible to provide a method for manufacturing a ball screw apparatus, a ball screw apparatus and a tool used for performing the method for manufacturing the ball screw apparatus, capable of shortening the time required for attaching the dust-proof component and.

A ball screw apparatus according to a fifth aspect of the present invention is obtained by performing the method for manufacturing the ball screw apparatus according to the fourth aspect.

Sixth and Seventh Aspects

According to a sixth aspect of the present invention, there is provided a dust-proof component having the following configurations of (3-1) and (3-2).

(3-1) The dust-proof component is a ring shaped dust-proof component used for a ball screw apparatus including a nut, a threaded shaft inserted into the nut, and a rolling element rolling between the nut and the threaded shaft. The dust-proof component is fitted to an inner circumference of an end portion of the nut in an axis direction and is screwed from the outside to the inside in the radial direction of the nut to seal a gap between the nut and the threaded shaft.

(3-2) The dust-proof component includes an annular main body formed on the inside in the radial direction and a pair of screw-receiving protrusions protruding outward in the radial direction from the outer circumferential surface of the main body and extending in the circumferential direction, and the pair of screw-receiving protrusions are arranged with a gap in the axis direction so as to allow the screw to being screwed into the gap.

In the dust-proof component according to the sixth aspect, preferably, the width in the axis direction of the gap is equal to or less than a root diameter of a male screw portion of the screw. Preferably, the width in the axis direction of an inner portion of the gap in the radial direction is equal to or less than the root diameter of the male screw portion of the screw, and the width in the axis direction of an outer portion of the gap in the radial direction of the gap is larger than the width in the axis direction of the inner portion of the gap in the radial direction.

In the dust-proof component according to the sixth aspect, more preferably, the width of the widest portion of the gap is equal to or less than the outer diameter of the male screw portion of the screw and equal to or larger than the root diameter of the male screw portion of the screw. Still more preferably, the screw-receiving protrusions are formed over the entire circumference of the outer circumferential surface of the main body. The dust-proof component according to the sixth aspect is still more preferably formed of elastomer.

According to a seventh aspect of the present invention, there is provided a ball screw apparatus including a nut, a threaded shaft inserted into the nut, a rolling element rolling between the nut and the threaded shaft, and the dust-proof component according to the sixth aspect.

According to the sixth and seventh aspects, it is possible to provide a dust-proof component and a ball screw apparatus having the dust-proof component capable of reducing a labor required for attaching the dust-proof component.

Eighth and Ninth Aspects

According to an eighth aspect of the present invention, there is provided a dust-proof component having the following configurations of (4-1) and (4-2).

(4-1) The dust-proof is used for a ball screw apparatus including a nut, a threaded shaft inserted into the nut, and a rolling element rolling between the nut and the threaded shaft and is screwed to an end portion of the nut in the axis direction from the outside in the radial direction of the nut to the inside in the radial direction to seal a gap between the nut and the threaded shaft.

(4-2) The dust-proof component includes a toroidal main body formed on the inside in the radial direction, plural screw-receiving protrusions protruding outward in the radial direction from the outer circumferential surface of the main body and extending in the axis direction, and shielding portion protruding outward in the radial direction from the outer circumferential surface of the main body and extending in the circumferential direction, the plural screw-receiving protrusions are formed with a gap in the circumferential direction of the outer circumferential surface of the main body, and the shielding portion is formed at an end portion of the screw-receiving protrusions in the axis direction and at an end portion of the gap in the axis direction.

In the dust-proof component according to the eighth aspect, preferably, the width of the gap in the circumferential direction is equal to or less than the root diameter of the male screw portion of the screw. More preferably, the screw-receiving protrusions are formed over the entire circumference of the outer circumferential surface of the main body. The dust-proof component according to the eighth aspect is still more preferably formed of elastomer.

According to a ninth aspect of the present invention there is provided a ball screw apparatus including a nut, a threaded shaft inserted into the nut, a rolling element rolling between the nut and the threaded shaft, and the dust-proof component according to the eighth aspect.

According to the eighth and ninth aspects, it is possible to provide a dust-proof component and a ball screw apparatus having the dust-proof component, capable of reducing a labor required for attaching the dust-proof component and.

The dust-proof components according to the sixth and eighth aspects can be used as the ring shaped seal in the method for manufacturing the ball screw according to the first and second aspects or the ring shaped seal constituting the ball screw according to the third aspect.

Advantageous Effects of Invention

In the method according to the present invention, by exerting the outward-directed force in the radial direction on the ring shaped seal to fix the seal to the nut in the seal fixing step of fixing the ring shaped seal to the attachment portion disposed in the end portion of the nut in the axis direction using the fixing member, the ring shaped seal is not pressed against the threaded shaft. Thus, it is possible to prevent generation of heat due to the friction between the ring shaped seal and the threaded shaft.

BRIEF DESCRIPTION OF DRAWINGS

FIG. 5 is a partial cross-sectional view illustrating a ball screw apparatus according to embodiments of fourth and fifth aspects when viewed from a radial direction of a threaded shaft;

FIGS. 27A to 27D are diagrams illustrating a method (conventional method) of forming a pilot hole on the outer circumferential surface of a seal.

DESCRIPTION OF EMBODIMENTS

Hereinafter, embodiments of the present invention will be described, but the present invention is not limited to the embodiments.

Embodiment of First to Third Aspects

Figure 1:
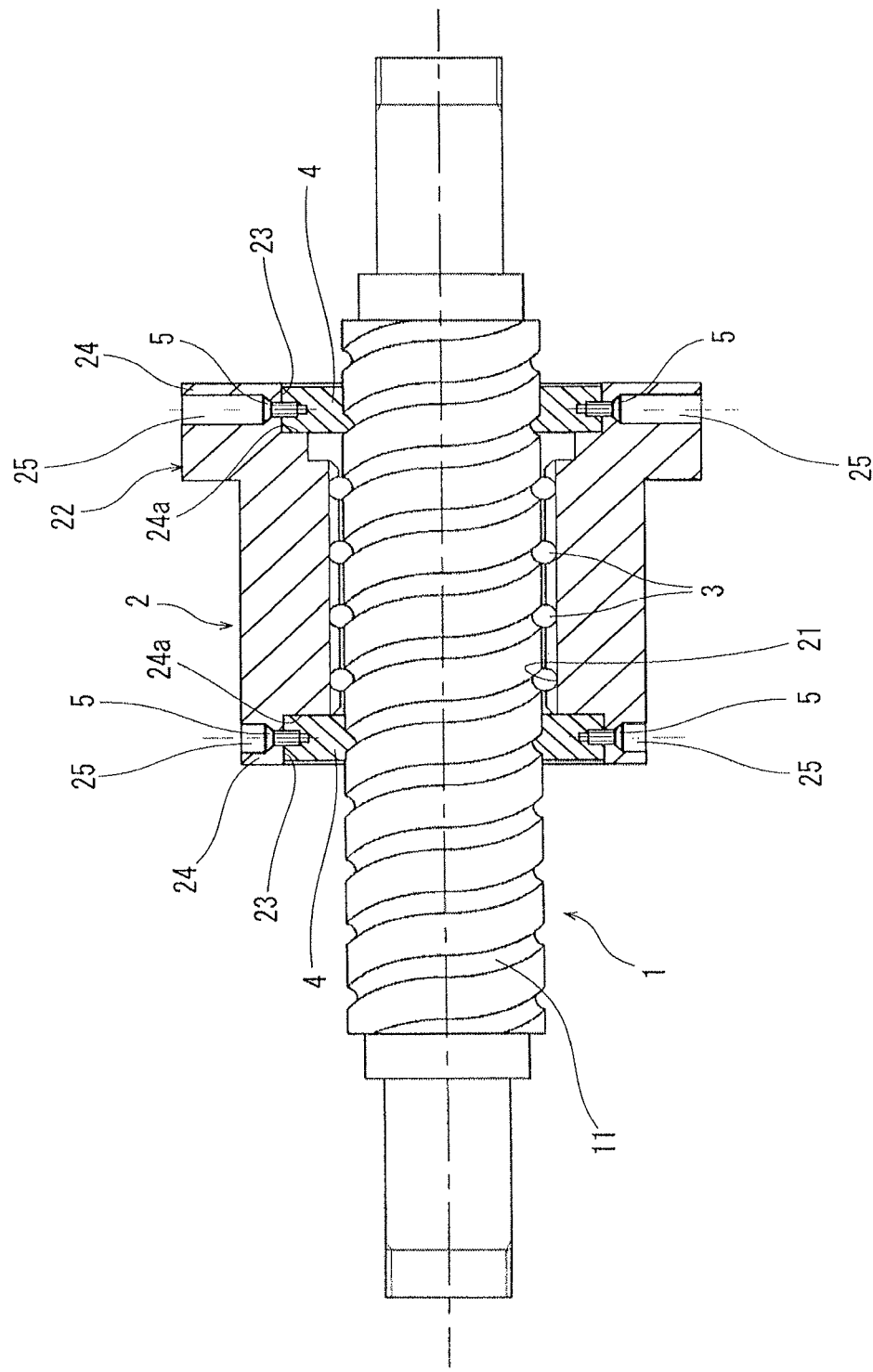
FIG. 1 is a diagram illustrating a ball screw according to embodiments of first to third aspects, in which a nut and a seal are illustrated in a cross-sectional view.

A ball screw according to this embodiment includes a threaded shaft 1, a nut 2, balls 3, a ring shaped seal (dust-proof component) 4, and a tapping screw (screw having a head) 5 used to fix the seal 4 to the nut 2 as illustrated in FIG. 1.

A spiral groove 11 is formed on the outer circumferential surface of the threaded shaft 1 and a spiral groove 21 is formed on the inner circumferential surface of the nut 2. The balls 3 are allocated in a raceway formed between the spiral groove 11 of the threaded shaft 1 and the spiral groove 21 of the nut 2.

A flange 22 is formed in an end portion of the nut 2 in the axis direction.

The diameter of the inner circumferential surface of the nut 2 at both end portions in the axis direction is larger than that in the portion in which the spiral groove 21 is formed. The portions having the inner circumferential surface 23 of which the diameter is larger serve as seal-attaching portions 24 of the nut 2. Two through holes 25 passing through the nut in the radial direction from the outer circumferential surface to the inner circumferential surface are formed in each seal-attaching portion 24. The two through holes 25 are formed at positions (angle positions between which the difference of central angle is 180 degrees) facing each other on the inner circumferential surface 23 of the seal-attaching portion 24.

Figure 2A:
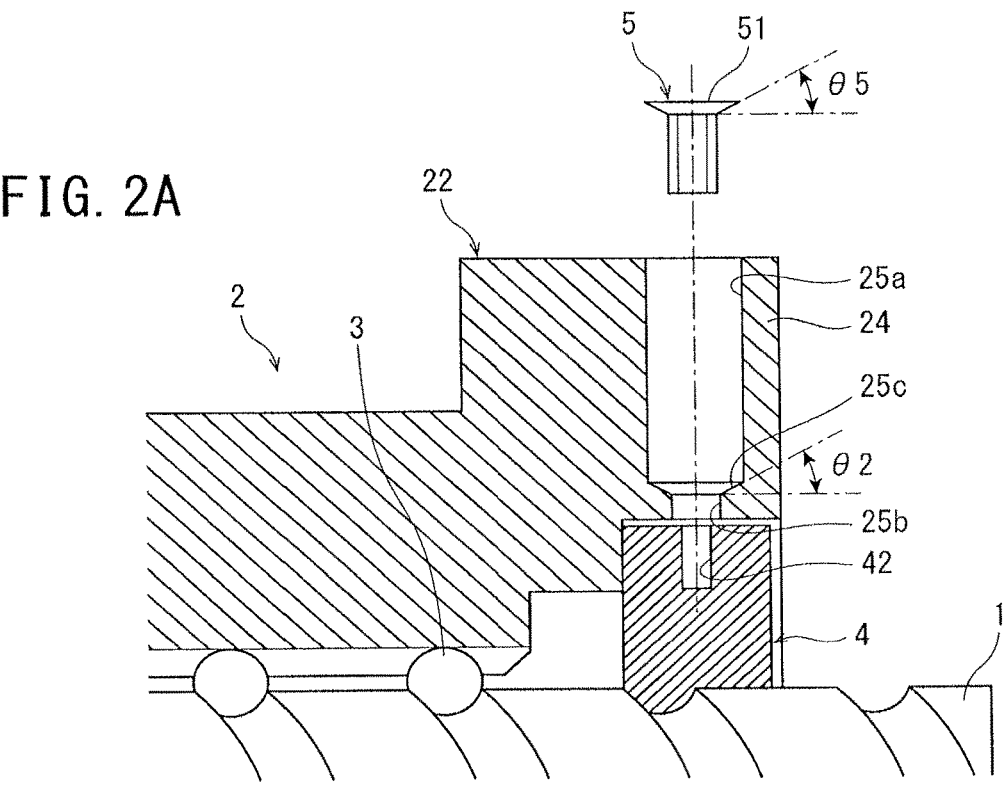
FIG. 2A is a partial cross-sectional view of FIG. 1 illustrating a state before the seal is fixed.

As illustrated in FIG. 2A, the tapping screw 5 has a dish shaped head 51. An angle (inclined surface angle) θ5 between an inclined surface of a cone forming the head 51 and a line perpendicular to the axis of the tapping screw 5 is 30 degrees.

As illustrated in FIG. 2A, the through hole 25 formed in the seal-attaching portion 24 includes a large-diameter portion 25a on the outer circumference side, a small-diameter portion 25b on the inner circumference side, and a conical portion 25c communicating between the large-diameter portion and the small-diameter portion. The diameter of the large-diameter portion 25a is larger than the diameter of the head 51 of the tapping screw 5. The diameter of the small-diameter portion 25b is larger than the outer diameter of a male screw portion of the tapping screw 5. An angle (inclined surface angle) θ2 between the inclined surface of the conical portion 25c and a line perpendicular to the axis of the through hole 25 is 30 degrees. The inclined surface of the conical portion 25c serves as a bearing face bearing the head 51 of the tapping screw 5.

The through hole 25 can be easily formed, for example, using a method of forming a through hole having the diameter of the small-diameter portion 25b with a drill and then forming a hole having the diameter of the large-diameter portion 25a on the outer circumference side of the through hole with a drill.

Figure 3A:
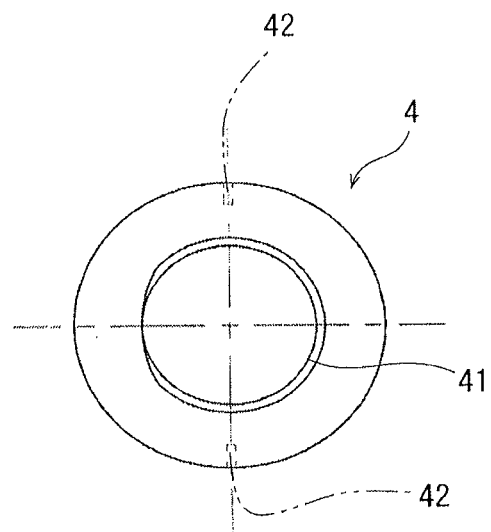
FIG. 3A is a front view of the seal attached to the ball screw illustrated in FIG. 1.
Figure 3B:
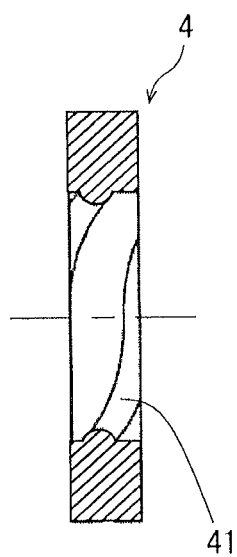
FIG. 3B is a cross-sectional view of the seal attached to the ball screw illustrated in FIG. 1.

As illustrated in FIGS. 3A and 3B, a protrusion 41 corresponding to the spiral groove 11 of the threaded shaft 1 is formed on the inner circumferential surface of the seal 4. As will be described later, concave portions (pilot hole, attachment hole) 42 extending in the radial direction are formed at the positions on the outer circumferential surface of the seal 4 corresponding to the through holes 25 of the seal-attaching portion 24 after the seal 4 is disposed in the seal-attaching portion 24 of the nut 2. These concave portions 42 are indicated by two-dot chained lines in FIG. 3A.

In this embodiment, the ball screw is assembled in the following way.

First, the balls 3 and the threaded shaft 1 are combined into the nut 2. Then, the seal 4 is fitted onto an end portion of the threaded shaft 1 in the axis direction and the seal 4 is rotated while pressing the seal in the axis direction of the threaded shaft 1. Accordingly, the seal 4 is moved and inserted into the inner circumferential surface 23 of the seal-attaching portion 24 of the nut 2. Then, the positions of the spiral groove 11 and the protrusion 41 of the seal 4 are matched with each other and then the seal 4 is slightly separated from an end face 24a of the seal-attaching portion 24 in the axis direction so as to prevent contact of the threaded shaft 1 with the seal 4.

Then, the concave portions 42 having a circular cross-section and extending in the radial direction are formed at the positions on the outer circumferential surface of the seal 4 corresponding to all the through holes 25 in the method described later with reference to FIG. 7 to FIG. 10. This state is illustrated in FIG. 2A. In this state, a gap is present between the inner circumferential surface 23 of the seal-attaching portion 24 and the seal 4. The diameter of each concave portion 42 is smaller than the root diameter of the male screw portion of the tapping screw 5.

Figure 2B:
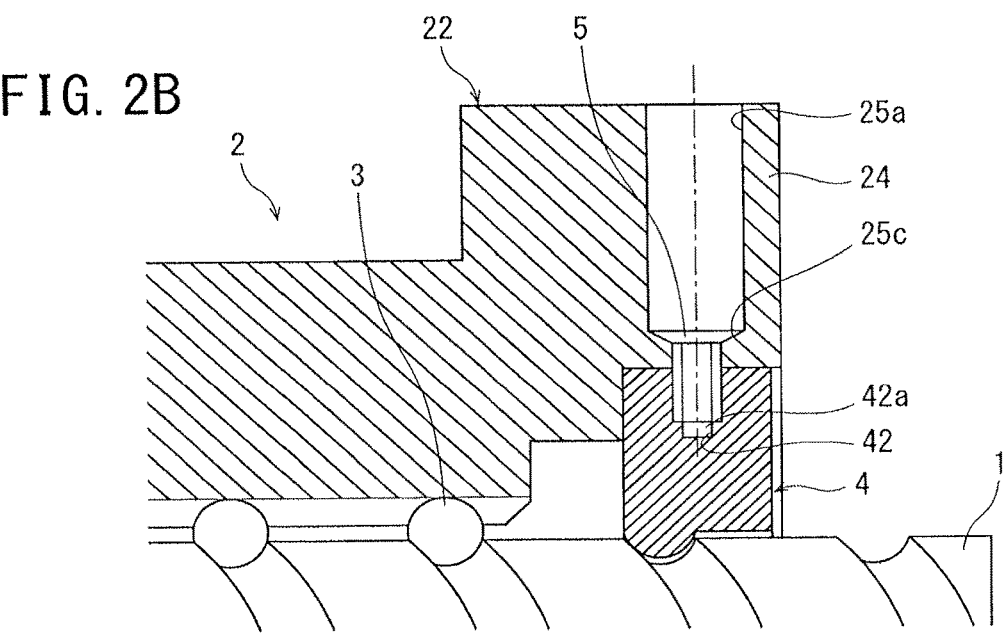
FIG. 2B is a partial cross-sectional view of FIG. 1 illustrating a state after the seal is fixed.

Then, the tapping screw 5 is inserted into the through hole 25, the tip thereof is brought into contact with the corresponding concave portion 42 of the seal 4, and the tapping screw 5 is rotated with a driver. Accordingly, the tapping screw 5 goes into the seal 4 while threading the surrounding of the concave portion 42 with the male screw portion thereof. At this time, after the inclined surface of the head 51 comes in contact with the inclined surface (bearing face) 25c of the through hole 25, an outward-directed force in the radial direction is exerted on the seal 4 because of the force of the inclined surface of the head 51 pressing the inclined surface 25c of the through hole 25. As a result, the seal 4 is fixed to the seal-attaching portion 24 of the nut 2 with the tapping screw 5. This state is illustrated in FIG. 2B. In this state, the seal 4 comes in contact with the inner circumferential surface 23 of the seal-attaching portion 24 and a clearance is formed between the seal 4 and the threaded shaft 1.

In the ball screw assembled in this way, since a force in a direction in which the seal is separated apart from the threaded shaft 1 is applied to the seal 4 in a state where the seal 4 is fixed to the nut 2, the seal 4 is not pressed against the threaded shaft 1 and thus generation of heat due to friction between the seal 4 and the threaded shaft 1 is prevented.

Since the fastening torque of the tapping screw 5 varies before and after the inclined surface of the head 51 comes in contact with the inclined surface 25c of the through hole 25, it is possible to determine the timing at which the fixation of the seal 4 to the nut 2 using the tapping screw 5 is completed by managing the fastening torque. That is, when the tapping screw 5 is fastened until the fastening torque varies, the seal 4 is surely fixed to the nut 2. Therefore, it is possible to easily determine whether or not the seal 4 is surely fixed to the nut 2 and thus it is not necessary to measure the depth in the through hole 25 up to the top of the screw using a caliper or the like for the purpose of checking the fixation state.

In the method according to this embodiment, since the inclined surface angle θ5 of the head 51 of the tapping screw 5 is 30 degrees, it is possible to easily manage the fastening torque in comparison with a case where a tapping screw having an inclined surface angle θ5 of 45 degrees is used. In addition, the rotation direction for fastening the tapping screw 5 is the same as the rotation direction of the drill for forming the inclined surface (bearing face) 25c of the through hole 25. Accordingly, even when the surface roughness of the inclined surface of the head 51 and the inclined surface 25c of the through hole 25 are not made to be small, it is possible to manage the fastening torque of the tapping screw 5 without any problem.

It is preferable that the concave portion (pilot hole) 42 of the seal 4 be formed with a depth at which the gap 42a is formed ahead of the tip of the tapping screw 5 in the state illustrated in FIG. 2B. Accordingly, it is possible to easily manage the fastening torque. It is preferable that the depth of the concave portion 42 be as large as possible. The pilot hole of the seal 4 may be formed as a through hole extending from the outer circumferential surface to the inner circumferential surface.

Figure 4A:
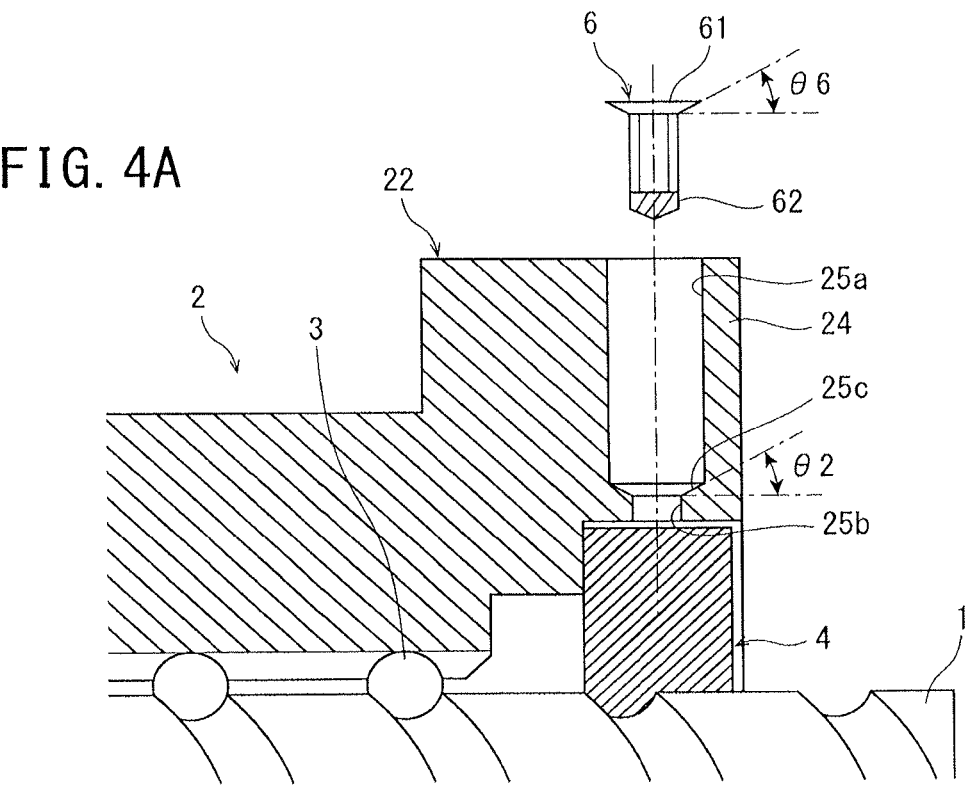
FIG. 4A is a diagram illustrating an example where a self-drill screw is used instead of a tapping screw in a state before the seal is fixed.
Figure 4B:
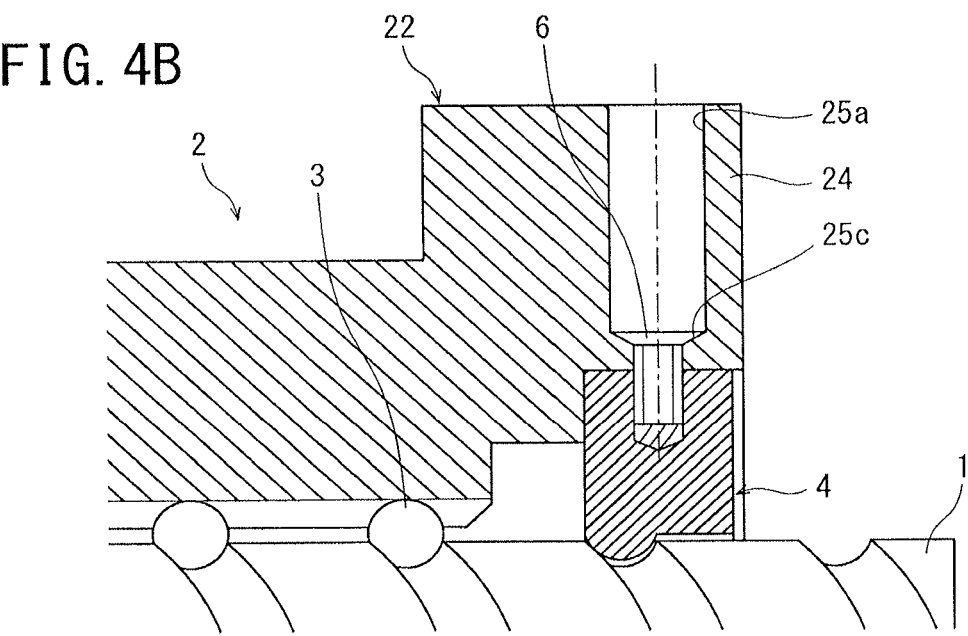
FIG. 4B is a diagram illustrating the example where the self-drill screw is used instead of the tapping screw in a state after the seal is fixed.

In the example illustrated in FIGS. 4A and 4B, a self-drill screw 6 is used instead of the tapping screw 5. The self-drill screw 6 has a cutting edge 62 formed at the tip of a tapping screw, and has a head 61 with an inclined surface angle θ6 of 30 degrees similarly to the head 51 of the tapping screw 5. In this case, since the concave portions 42 do not have to be formed in the seal 4 unlike the example illustrated in FIGS. 2A and 2B, it is possible to reduce manufacturing costs.

In the method according to this embodiment, since the seal 4 is fixed to the nut 2 using the tapping screw 5 or the self-drill screw 6 having a head, this method can be applied to the fixation of a thin (with a small size in the axis direction) seal 4 by using a screw with a shaft portion of a small diameter.

In this embodiment, a female screw is not formed in the outer circumferential portion of the seal 4, and an outward-directed force in the radial direction is exerted on the seal 4 to fix the seal 4 to the nut 2 by threading the seal 4 with the male screw portion of the tapping screw 5 or the self-drill screw 6 and causing the male screw portion to engage with the seal 4. However, by forming a female screw in the outer circumferential portion of the seal 4 and screwing a male screw portion of a screw having a head thereto, the outward-directed force in the radial direction may be exerted on the seal 4 to fix the seal 4 to the nut 2.

In this embodiment, the screw having a head is used as the fixing member, but the fixing member used in the method according to the first aspect may be a member other than the "screw having a head", as long as "the fixing member can generate the outward-directed force in the radial direction exerted on the seal by causing the fixing member to pass through the through hole in the seal-attaching portion and to engage with the outer circumferential portion of the seal".

Embodiments of Fourth and Fifth Aspects

Figure 6A:
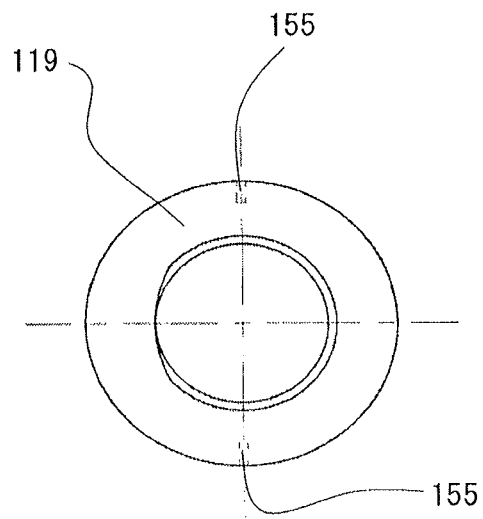
FIG. 6A is an outside view of a dust-proof component according to embodiments of the fourth and fifth aspects when viewed in an axis direction of a threaded shaft.
Figure 6B:
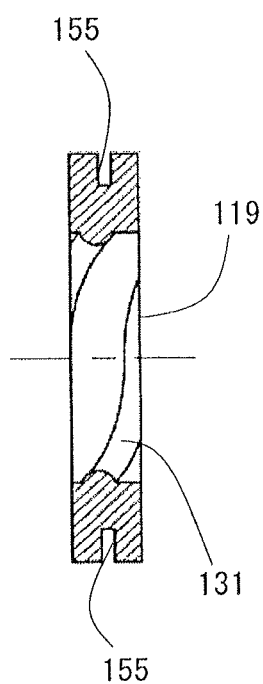
FIG. 6B is a cross-sectional view of the dust-proof component according to embodiments of the fourth and fifth aspects when viewed in a radial direction of the threaded shaft.
Figure 6C:
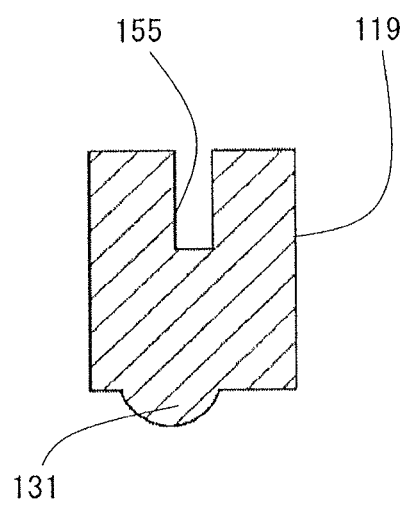
FIG. 6C is a partial enlarged view of FIG. 6B.

FIG. 5 is a partial cross-sectional view of a ball screw apparatus according to this embodiment when viewed from the radial direction of the threaded shaft. FIGS. 6A, 6B, and 6C are an outside view of a dust-proof component when viewed from the axis direction of the threaded shaft, a cross-sectional view of the dust-proof component when viewed from the radial direction of the threaded shaft, and a partial enlarged view of FIG. 6B, respectively.

As illustrated in FIG. 5, the ball screw apparatus 101 according to this embodiment includes a threaded shaft 104 having a circular cross-section and a nut 107 through which the threaded shaft 104 is disposed to pass. A spiral thread groove 110 is formed on the outer circumferential surface of the threaded shaft 104, and a spiral groove 113 facing the thread groove 110 is formed on the inner circumferential surface of the nut 107.

A rolling passage of balls 116 as a rolling element is formed by the thread groove 110 on the outer circumferential surface of the threaded shaft 104 and the spiral groove 113 on the inner circumferential surface of the nut 107. The nut 107 engages with the threaded shaft 104 via plural balls 116 rolling in the rolling passage. A dust-proof component 119 for sealing a gap between the nut 107 and the threaded shaft 104 is arranged on each of both end portions of the nut 107. The dust-proof component 119 is an annular seal member as illustrated in FIGS. 6A and 6B.

In the nut 107 used in the ball screw apparatus 101 according to this embodiment, a flange portion 122 is formed on one end portion thereof. Therefore, the wall thickness of one end portion having the flange portion 122 of the nut 107 differs from the wall thickness of the other end portion not having the flange portion 122 of the nut 107. The inner diameters of both end portions of the nut 107 are enlarged and an annular stepped portion 125 is formed in the vicinity of each end portion of the inner circumferential surface thereof. The enlarged inner diameters of both end portions are identical to each other. A receiving portion 128 for receiving the dust-proof component 119 is formed by the inner circumferential surface of the portion of which the inner diameter is enlarged and the annular stepped portion 125.

As illustrated in FIG. 5, the dust-proof component 119 is fitted into the receiving portions 128 of both end portions of the inner circumferential surface so as to be disposed therein, and the outer circumferential surface of the dust-proof component 119 comes in contact with the inner circumferential surface of the receiving portion 128. The inner circumferential surface of the dust-proof component 119 has a female shape corresponding to a male shape of the surface of the threaded shaft 104. Specifically, as illustrated in FIGS. 6B and 6C, a protrusion 131 corresponding to the shape of the thread groove 110 formed on the surface of the threaded shaft 104 is formed on the inner circumferential surface of the dust-proof component 119. Accordingly, it is possible to surely seal the gap between the threaded shaft 104 and the nut 107 and to prevent entry of foreign matters such as dusts.

Plural through holes 134 extending in the radial direction through the outer circumferential surface of the nut 107 and the inner circumferential surface of the receiving portion 128 are formed in both end portions of the nut 107. The plural through holes 134 are arranged in each end portion in the circumferential direction and the same number of (two in this embodiment) through holes are formed in both end portions.

As illustrated in FIG. 5, each through hole 134 is a two-step hole including a hole with a large diameter (hereinafter, referred to as a "large-diameter portion 137") extending from the outer circumferential surface of the nut 107 to the vicinity of the inner circumferential surface of the receiving portion 128 and a hole with a small diameter (hereinafter, referred to as a "small-diameter portion 143") extending from the bottom of the large-diameter portion 137 to the inner circumferential surface of the nut 107.

A stepped portion 140 is formed in the inner wall of each through hole 134 by the large-diameter portion 137 and the small-diameter portion 143. The diameter of the large-diameter portion 137 is set to be slightly larger than that of a shank portion of a drill for machining to be described later. The diameter of the small-diameter portion 143 is set to be slightly smaller than that of the shank portion and to be larger than the diameter of a bit portion of the drill for machining. A female screw, not illustrated, is formed on the inner circumferential surface of the small-diameter portion 143 by tapping.

In this embodiment, the through holes 134 formed in the end portion having the flange portion 122 and the through holes 134 formed in the end portion not having the flange portion 122 have the same distance in the radial direction from the central axis of the nut 107 to the stepped portion 140 of the through holes 134. That is, the distances from the central axis of the nut 107 to the stepped portions 140 of the through holes 134 are identical to each other. In both end portions of the nut 107, the thicknesses from the inner circumferential surface of the receiving portion 128 to the stepped portions 140 of the through holes 134, that is, the distances in the radial directions, are identical to each other. In other words, the depths of the small-diameter portion 143 of the through holes 134 are identical to each other.

On the outer circumferential surface of the dust-proof component 119 fitted into each receiving portion 128 of the nut 107, screw-fixing holes 146 are formed at the positions corresponding to the through holes 134 formed in both end portions of the nut 107. A female screw, not illustrated, is formed on the inner circumferential surface of each screw-fixing hole 146 by tapping. A fastening member 149 is screwed into each through hole 134 from the outer circumferential surface of the nut 107.

In this embodiment, the fastening member 149 is a screw member. The large-diameter portion 137 has a diameter larger than the diameter of the fastening member 149 and serves as a guide in screwing the fastening member 149. The shaft portion of the fastening member 149 engages with the female screw of the small-diameter portion 143 of each through hole 134 and the tip of the fastening member 149 engages with each screw-fixing hole 146 of the dust-proof component 119. The dust-proof component 119 is fixed to the receiving portion 128 of the nut 107 through the engagement.

Figure 7:
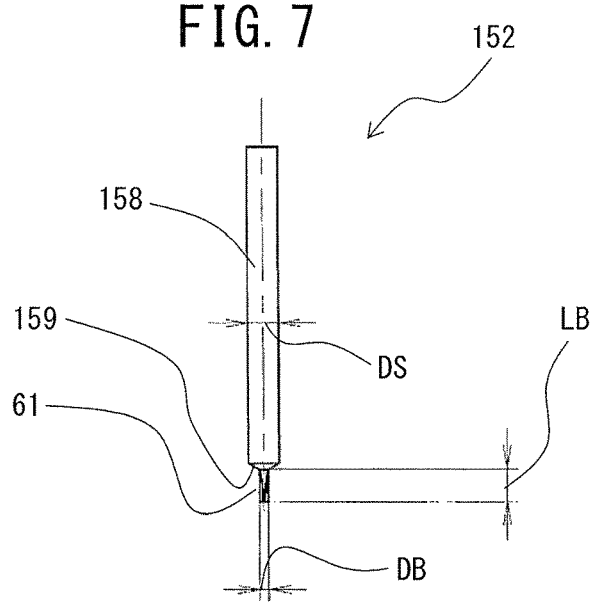
FIG. 7 is an outside view of a drill used in manufacturing the ball screw apparatus according to the embodiments of the fourth and fifth aspects.

A tool used for manufacturing the ball screw apparatus 101 according to this embodiment will be described below. FIG. 7 is an outside view of a drill 152 used for manufacturing the ball screw apparatus 101 according to this embodiment. Specifically, the drill 152 is used to form a pilot hole 155 for tapping (see FIGS. 6A, 6B, and 6C) for forming the screw-fixing holes 146 on the outer circumferential surface of the dust-proof component 119.

As illustrated in FIG. 7, the drill 152 includes a shank 158 and a bit portion 161 attached to the tip of the shank 158. The diameter DS of the shank 158 is larger than the diameter DB of the bit portion 161. The machining using the drill 152 is performed in a state where the shank 158 is attached to a rotational drive unit 64 (see FIG. 9) of a processing machine, not illustrated.

The diameter DS of the shank 158 is larger than the diameter of the small-diameter portion 143 of each through hole 134 formed in the nut 107 and is slightly smaller than the diameter DH (see FIG. 9) of the large-diameter portion 137. Specifically, the diameter of the shank is smaller by 0.2 mm to 0.3 mm than the diameter of large-diameter portion 137 of the through hole 134.

The diameter DB of the bit portion 161 is equal to the inner diameter of the screw-fixing hole 146 of the dust-proof component 119, that is, the inner diameter of the female screw formed on the inner circumferential surface of the screw-fixing hole 146. The length LB of the bit portion 161 is set to the total sum of the depth of the screw-fixing hole 146 to be formed and the depth of the small-diameter portion 143 of the through hole 134. The shank 158 has a length sufficiently larger than the wall thickness of the nut 107.

Figure 8:
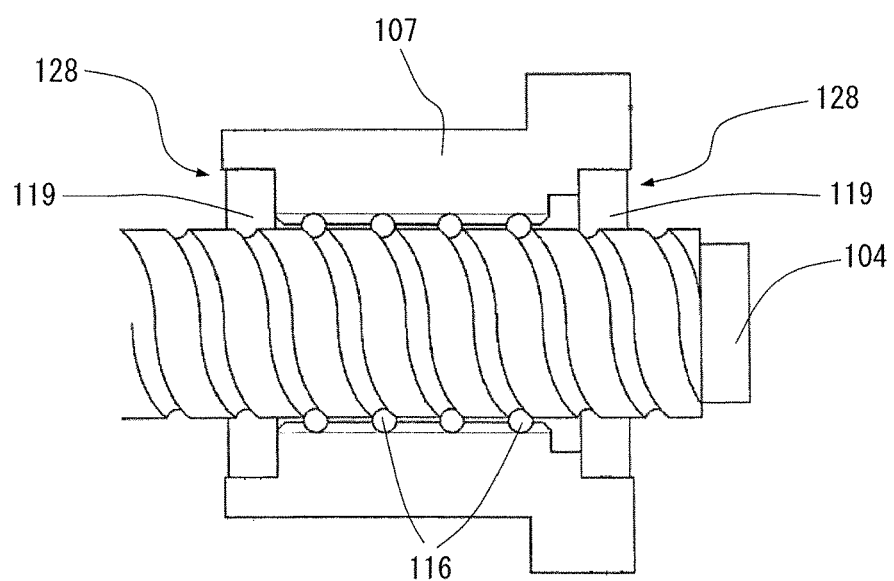
FIG. 8 is a partial cross-sectional view illustrating a main part of the ball screw apparatus under manufacturing according to the embodiments of the fourth and fifth aspects.

A method of manufacturing the ball screw apparatus 101 according to this embodiment using the drill 152 having the above-mentioned configuration will be described below. FIG. 8 is a partial cross-sectional view of a main part of the ball screw apparatus 167 under manufacturing. Here, the ball screw apparatus 167 under manufacturing means a state where a dust-proof component 28 is fitted into the receiving portion 128 of the nut 107. First, in this state, through holes 134 are formed in both end portions of the nut 107.

The through holes 134 are formed using a known drill in a processing machine, not illustrated, such as a drilling machine. Each through hole 134 includes a large-diameter portion 137 having a diameter larger than the diameter of the fastening member 149, a small-diameter portion 143 engaging with the fastening member 149, and a stepped portion 140 between the large-diameter portion 137 and the small-diameter portion 143. In this embodiment, the thickness from the inner circumferential surface of the receiving portion 128 of the nut 107 to the stepped portion 140, that is, the distance in the radial direction, is constant in all the through holes 134. In other words, the depth of the small-diameter portion 143 is constant in all the through holes 134.

In order to set the depths of the small-diameter portions 143 to be identical as described above, for example, the through holes 134 are formed as follows. The wall thickness of the end portion having the flange portion 122 of the nut 107 and the end portion not having the flange portion 122, that is, the distance from the inner circumferential surface of each receiving portion 128 to the outer circumferential surface of the nut 107, is measured in advance. By the differences between the wall thicknesses and the depth of the small-diameter portion 143, the both of end portion of the nut 107 are drilled from the outer circumferential surface of the nut 107 with a known drill to be used for forming the large-diameter portion 137. Then, after the drilling, the wall thickness corresponding to the depth of the small-diameter portion 143 remains in the inner circumferential surface of the nut 107.

Figure 9:
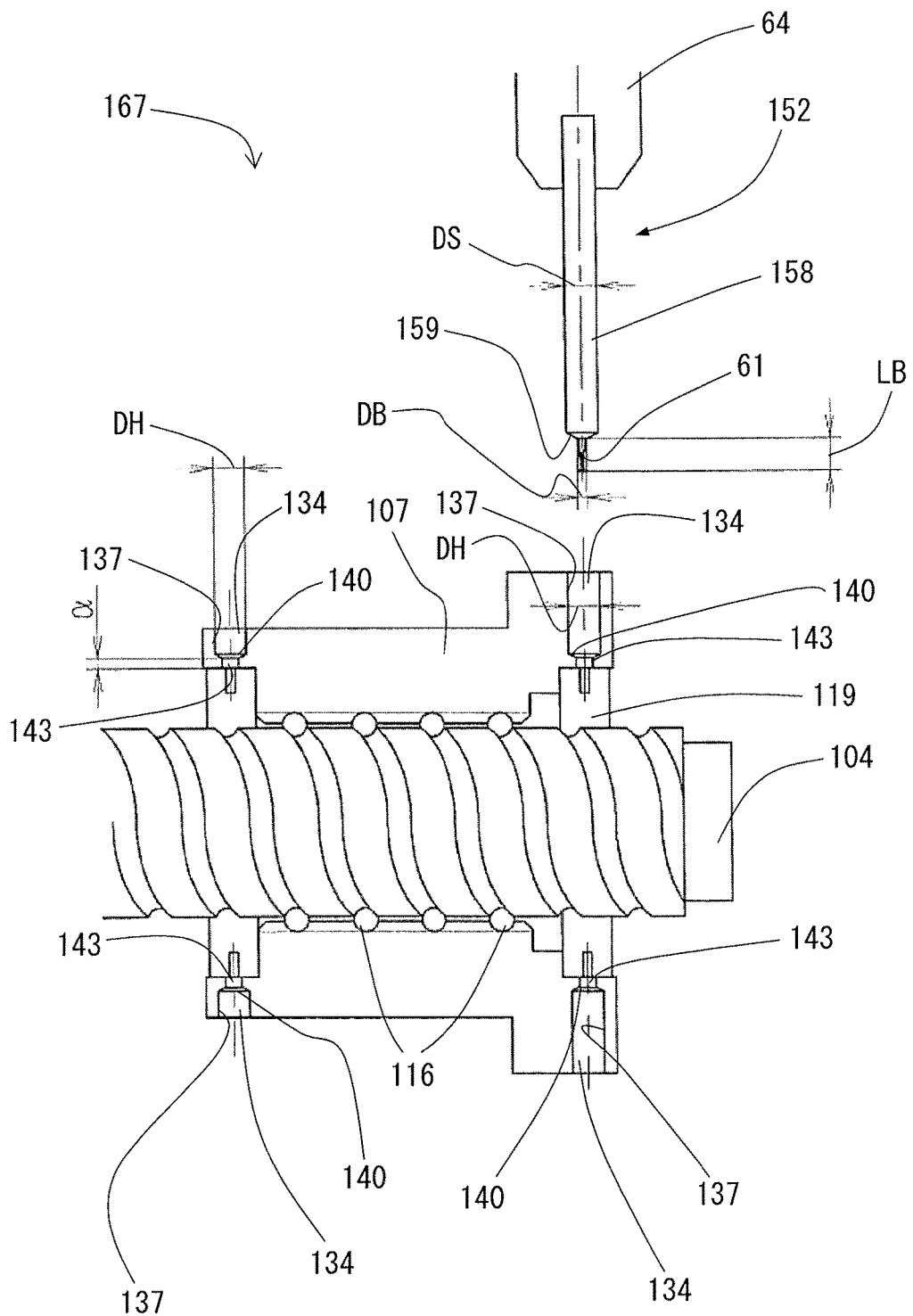
FIG. 9 is a diagram illustrating a partial cross-section of a main part of the ball screw apparatus under manufacturing according to the embodiments of the fourth and fifth aspects and a drill, where a through hole is formed in a nut.
Figure 10:
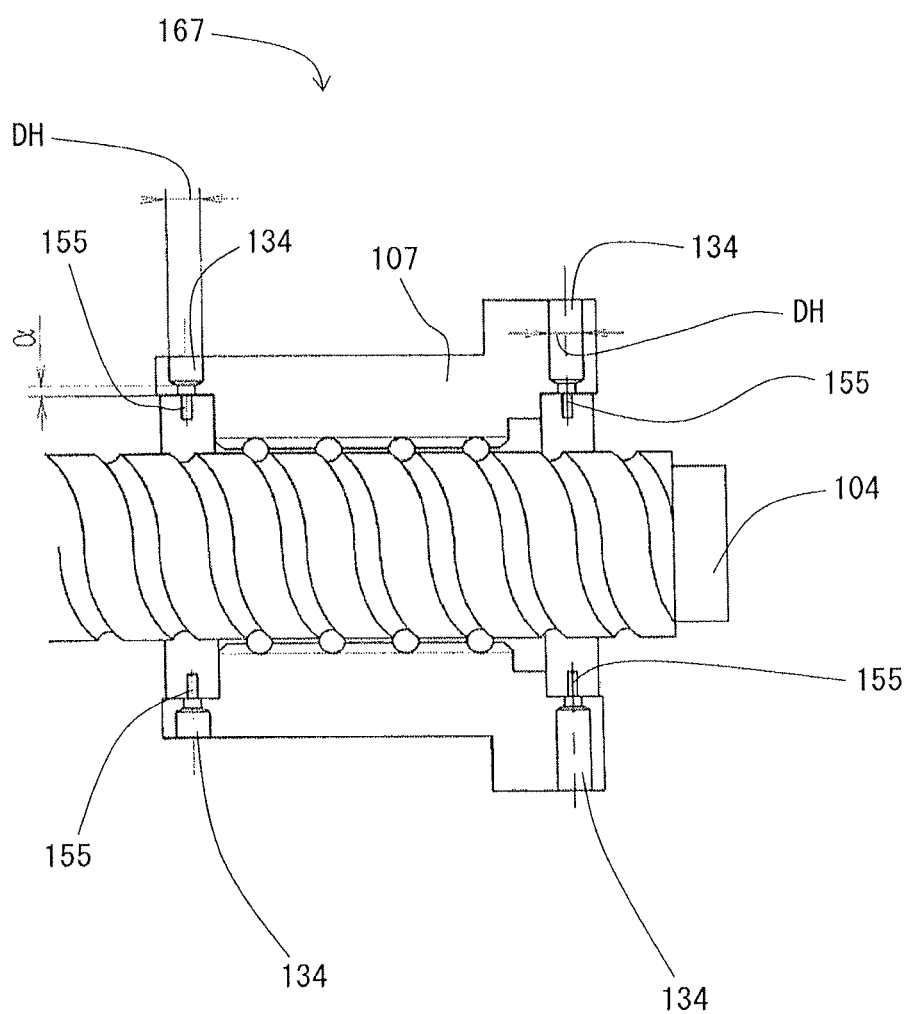
FIG. 10 is a partial cross-sectional view illustrating a main part of the ball screw apparatus under manufacturing according to the embodiments of the fourth and fifth aspects, where a pilot hole for tapping is formed.

Thereafter, the remaining wall thickness portion is drilled from the bottom of the large-diameter portion 137 with a known drill to be used for forming the small-diameter portion 143. FIG. 9 illustrates a state where the through holes 134 are formed in the nut 107 in this way. FIG. 9 also illustrates the drill 152 used to form the pilot hole 155 for tapping in the next step. The formation of the pilot hole 155 for tapping using the drill 152 is performed as follows.

The drill 152 and the ball screw apparatus 167 under manufacturing are set to a processing machine, not illustrated, such as a drilling machine. The drill 152 is rotationally driven to insert the bit portion 61 into the through hole 134 from the outer diameter side of the nut 107. In the drill 152 inserted into the through hole 134, the shank 158 forward moves in the radial direction of the nut 107 along the large-diameter portion 137 and the tip of the bit portion 61 reaches the small-diameter portion 143 of the through holes 134.

When the drill 152 forward moves, the tip of the bit portion 61 passes through the small-diameter portion 143 and reaches the inner circumferential surface of the receiving portion 128, that is, the outer circumferential surface of the dust-proof component 119 in contact with the inner circumferential surface of the receiving portion 128. In this state, the tip 159 of the shank 158 does not yet reach the bottom of the large-diameter portion 137, that is, the stepped portion 140. When the drill 152 forward moves, the bit portion 61 drills the dust-proof component 119 from the outer circumferential surface to form a hole extending inward in the radial direction of the nut 107.

The forward movement of the drill 152 is restrained when the tip 159 of the shank 158 reaches the stepped portion 140 of the through hole 134, because the diameter DS of the shank 158 is larger than the diameter of the small-diameter portion 143. That is, the stepped portion 140 of the through hole 134 serves as a stopper of the drill 152. When the drill 152 forward moves to this state, the drill 152 is extracted from the large-diameter portion 137. Then, a concave portion having a predetermined depth is formed on the outer circumferential surface of the dust-proof component 119. This concave portion is the pilot hole 155 for tapping illustrated in FIGS. 6A, 6B, and 6C.

The same operation is performed on all the other through holes 134. FIGS. 6B, and 6C are partial cross-sectional views illustrating a main part of the ball screw apparatus 167 in a state where all the pilot holes 155 for tapping are formed in the state illustrated in FIG. 5. As described above, the thicknesses (indicated by α in FIGS. 9 and 10) from the inner circumferential surfaces of the receiving portions 128 to the stepped portions 140 of the through holes 134 in both end portions of the nut 107 are identical. In other words, the depths of the small-diameter portions 143 of the through holes 134 are all identical.

Then, by inserting the tip 159 of the shank 158 of the drill 152 into the through hole 134 until coming in contact with the stepped portion 140 of the through hole 134, the depths of the pilot holes 155 for tapping formed on the outer circumferential surface of the dust-proof component 119 are identical in forming any through hole 134. That is, the stepped portions 140 of the through holes 134 define the processing distance of the drill 152 on the dust-proof component 119 so that the depths of the pilot holes 155 for tapping are identical.

When the formation of the pilot holes 155 for tapping in the dust-proof component 119 is completed, the small-diameter portions 143 of the through holes 134 and the pilot holes 155 are tapped so as to form female screws, not illustrated. In this way, the pilot holes 155 are formed at the position of the screw-fixing holes 146. Thereafter, the fastening members 149 for fastening the dust-proof component 119 to the nut 107 are screwed into the through holes 134. At this time, the large-diameter portions 137 of the through holes 134 guide the fastening members 149 to the fastening position. The shaft portion of each fastening member 149 engages with the female screw of the small-diameter portion 143 of the corresponding through hole 134 and the tip of fastening member 149 engages with the corresponding screw-fixing hole 146 of the dust-proof component 119. By this engagement, the dust-proof component 119 is fixed to the receiving portion 128 of the nut 107.

As described above, in this embodiment, by only rotationally driving the drill 152 and inserting the drill into each through hole 134 until the tip 159 of the shank 158 reaches the stepped portion 140 of the through hole 134, it is possible to form the pilot holes 155 for tapping having the same depth in the dust-proof component 119.

Since the outer diameter of the flange portion 122 and the diameter of the portion other than the flange portion 122 in the nut 107 are set depending on customer requirements, the wall thickness of the nut 107 is different depending on the nuts 107 to be used.

When the thickness from the inner circumferential surface of the receiving portion 128 for receiving the dust-proof component 119 to the stepped portion 140 of the through hole 134 is set, for example, to the same a as in this embodiment in any nut 107 of the nuts 107 having various wall thicknesses and the nut is processed the drill 152 according to this embodiment, the pilot holes 155 for tapping with the same depth can be formed on the outer circumferential surface of the dust-proof component 119 regardless of the wall thickness from the inner circumferential surface of the receiving portion 128 to the outer circumferential surface of the nut 107.

That is, management of the depth of the pilot hole for tapping, which was previously performed by nuts having various sizes and various wall thicknesses was thus requires a lot of labors, can be easily performed.

As a result, it is possible to shorten the time required for attachment of the dust-proof component, compared with the conventional processing method using a gauge and a stopper which is attached to a drill. Actually, it is possible to shorten the required time to a half or less, compared with the operation of attaching the dust-proof component using the conventional processing method described in the Background Art. Unlike in the related art, anyone other than an experienced operator can simply, rapidly, and surely attach and fix a dust-proof component to a nut.

Description of Problem to be Solved by Sixth to Ninth Aspects

As the method of forming the pilot holes 42 in the seal 4 to correspond to the through holes 25 formed in the seal-attaching portion 24 in the step of fixing the seal 4 to the nut 2, even the method described in the embodiment of the fourth and fifth aspects requires a lot of labor. The problem to be solved by the sixth to ninth aspects is to reduce the labor.

An example of the method of determining the positions of the pilot holes to be formed in the seal to correspond to the through holes formed in the seal-attaching portion of the nut, forming the pilot holes at the determined positions, and then fixing the seal to the nut will be described below with reference to FIGS. 11A to 11C and 12A to 12C.

Figure 11A:
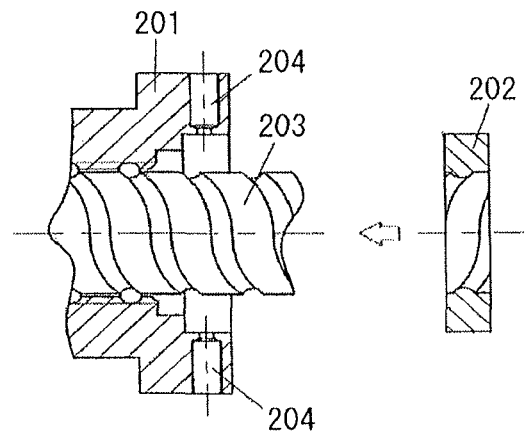
FIG. 11A is a cross-sectional view illustrating a step of temporarily fitting the dust-proof component to a spigot joint portion of a nut out of steps of the first half in a method of attaching a dust-proof component to a ball screw apparatus, which corresponds to a problem to be solved by sixth to ninth aspects.

First, as illustrated in FIG. 11A, by causing an end portion of a threaded shaft 203 to pass through a toroidal dust-proof component 202 and rotating the dust-proof component 202, the dust-proof component 202 moves over the threaded shaft 203 to a nut 201 and is fitted into a spigot joint portion formed in an end portion of the nut 201.

Figure 11B:
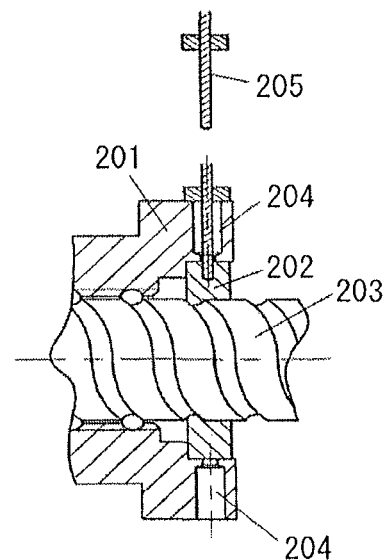
FIG. 11B is a cross-sectional view illustrating a step of forming a screw hole in the dust-proof component out of the steps of the first half in the method of attaching a dust-proof component to a ball screw apparatus, which corresponds to the problem to be solved by the sixth to ninth aspects.

The phases (position in the circumferential direction) of the dust-proof component 202 and the threaded shaft 203 are matched with each other, and then a drilled hole is formed inward in the radial direction from the outer circumferential surface of the dust-proof component 202 by inserting a drill 205 equipped with a special tool (stopper) so as to stop at a desired depth into a screw hole portion 204 formed in advance in the radial direction in the nut 201 as illustrated in FIG. 11B.

In this way, by determining the position of the drilled hole depending on actual members to be used, it is possible to obtain sealing performance with high accuracy regardless of slight deviations in size between components generated in component manufacturing steps.

Figure 11C:
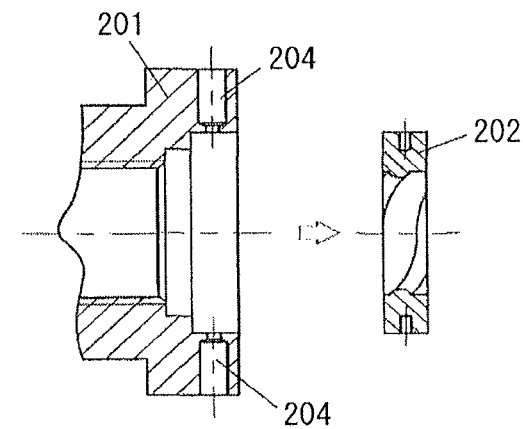
FIG. 11C is a cross-sectional view illustrating a step of disassembling the nut, the threaded shaft, and the dust-proof component out of the steps of the first half in the method of attaching a dust-proof component to a ball screw apparatus, which corresponds to the problem to be solved by the sixth to ninth aspects.
Figure 12A:
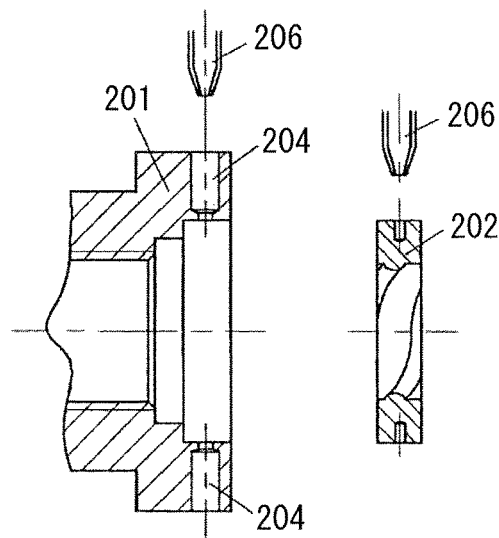
FIG. 12A is a cross-sectional view illustrating a step of blowing off shavings using an air blowout of steps of the second half in the method of attaching a dust-proof component to a ball screw apparatus, which corresponds to the problem to be solved by the sixth to ninth aspects.
Figure 12B:
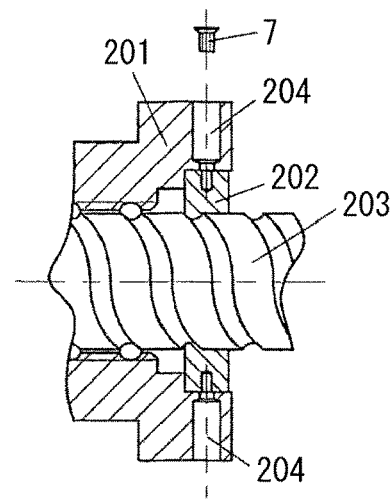
FIG. 12B is a cross-sectional view illustrating a step of fixing the dust-proof component to the nut using a tapping screw out of the steps of the second half in the method of attaching a dust-proof component to a ball screw apparatus, which corresponds to the problem to be solved by the sixth to ninth aspects.

Thereafter, the nut 201, the dust-proof component 202, are the threaded shaft 203 are disassembled as illustrated in FIG. 11C, and shavings generated by the drilling is blown off from the nut 201 and the dust-proof component 202 with air blow from an air blower 206 as illustrated in FIG. 12A. Then, as illustrated in FIG. 12B, the nut 201, the dust-proof component 202, and the threaded shaft 203 are combined again and the dust-proof component 202 is fixed to the nut 201 by inserting a tapping screw 7 into the screw hole portion 204 and screwing the tapping screw into the drilled hole formed in the dust-proof component 202.

Figure 12C:
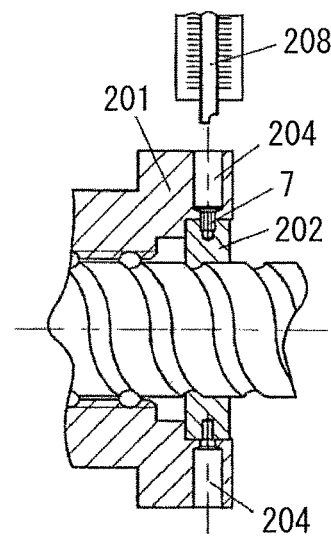
FIG. 12C is a cross-sectional view illustrating a step of checking a fixed state of the tapping screw using a caliper out of the steps of the second half in the method of attaching a dust-proof component to a ball screw apparatus, which corresponds to the problem to be solved by the sixth to ninth aspects.

Finally, as illustrated in FIG. 12C, the depth from the outer circumferential surface of the nut 201 to the tapping screw 7 is measured with a caliper 208, the fixation state of the tapping screw 7 is checked, and then the attachment operation is finished.

This method requires a lot of labors for attachment of a dust-proof component.

Embodiments of Sixth and Seventh Aspects

First Embodiment

Figure 13:
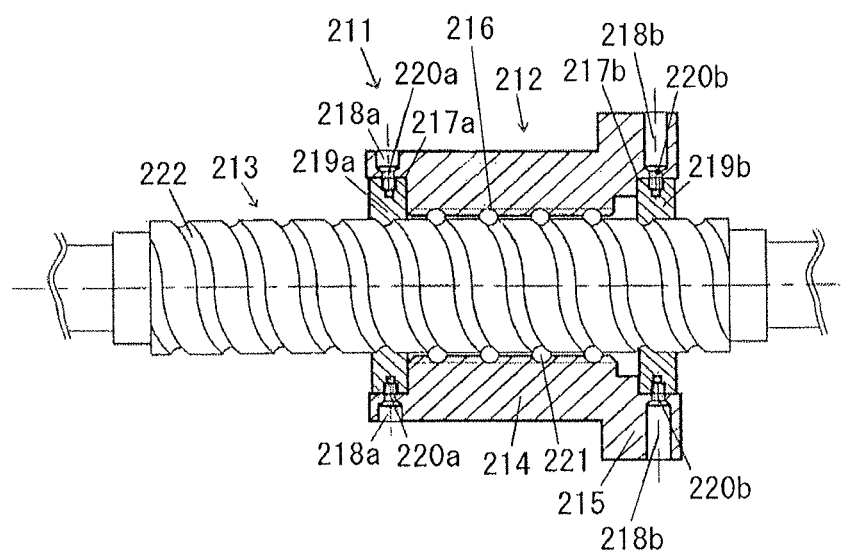
FIG. 13 is a cross-sectional view of a ball screw apparatus according to a first embodiment of the sixth and seventh aspects.

An embodiment of the sixth and seventh aspects will be described below with reference to FIGS. 13, 14A to 14C, and to 15A to 15C. FIG. 13 illustrates a ball screw apparatus 211 according to this embodiment and illustrates a cross-section of a nut 212 cut in the axis direction thereof and a lateral surface of a threaded shaft 213.

The ball screw apparatus 211 according to this embodiment includes a nut 212, a threaded shaft 213 inserted into the nut 212, and plural balls 221 interposed between the nut 212 and the threaded shaft 213.

The nut 212 includes a cylindrical portion 214 formed of metal and having a cylindrical shape and a flange 215 formed of metal as a unified body with the cylindrical portion 214 and having an outer diameter larger than that of the cylindrical portion at an end of the cylindrical portion in the axis direction.

An outer rolling surface 216 having a spiral shape is formed on the inner circumferential surface of the cylindrical portion 214, and a spigot joint portion 217a is formed in an end portion opposite to the flange 215. The cross-sectional shape of the outer rolling surface 216 is a gothic arc shape. The spigot joint portion 217a includes an inner circumferential surface having a cylindrical shape parallel to the axis direction and an annular surface formed inside the nut and perpendicular to the axis direction.

In a cylindrical portion forming the inner circumferential surface of the spigot joint portion 217a, screw hole portions 218a penetrating the cylindrical portion in the radial direction are formed. The screw hole portions 218a are disposed at two positions facing each other in the radial direction. Each of screw hole portions 218a includes a counter boring portion formed outside in the radial direction and a female screw portion formed inside the counter boring portion in the radial direction.

A toroidal dust-proof component 219a formed of elastomer is fitted into the spigot joint portion 217a and is fixed to the cylindrical portion 214 with a tapping screw 220a. The tapping screw 220a is screwed into the dust-proof component 219a, and the male screw portion of the tapping screw 220a and the dust-proof component 219a come in close contact with each other such that shearing resistance against the male screw portion prevents the dust-proof component 219a from being displaced in the axis direction.

A spigot joint portion 217b is formed in an end portion opposite to the flange 215. The spigot joint portion 217b includes an inner circumferential surface having a cylindrical shape parallel to the axis direction and an annular surface formed inside the nut and perpendicular to the axis direction. In a toroidal cylindrical portion forming the portion on the outer side of the spigot joint portion 217b in the radial direction, screw hole portions 218b penetrating the cylindrical portion in the radial direction are formed. The screw hole portions 218b are disposed at two positions facing each other in the radial direction. Each of the screw hole portions 218b includes a counter boring portion formed outside in the radial direction and a female screw portion formed inside in the radial direction from the counter boring portion. The depth in the radial direction of counter boring portion formed in the screw hole portion 218b is larger than that of the screw hole portion 218a, by the thickness of the flange 215 in the radial direction. The number of screw hole portions 218a and 218b are not limited to two but the screw hole portions may be formed at three or more positions if necessary.

The toroidal dust-proof component 219b formed of elastomer is fitted into the spigot joint portion 217b, and is fixed to the spigot joint portion 217b with a tapping screw 220b. By setting the shapes and the sizes of the spigot joint portions 217a and 217b to be equal to each other, the dust-proof components 219a and 219b having the same shape and size can be manufactured and used for both spigot joint portions 217a and 217b. The dust-proof components 219a and 219b may be formed of elastic materials other than elastomer. The dust-proof components 219a and 219b may include a metal core so as to maintain the shape and to enhance strength.

An inner rolling surface 222 having a spiral and facing the outer rolling surface 216 formed on the inner circumferential surface of the cylindrical portion 214 is formed on the outer circumferential surface of the threaded shaft 213. The cross-sectional shape of the inner rolling surface 222 is a substantially arc shape and is a shape in which a clearance groove, not illustrated, is formed on the bottom thereof. In order to enhance sealing performance, a configuration not having the clearance groove may be employed.

A rolling passage is formed by the outer rolling surface 216 formed on the inner circumferential surface of the cylindrical portion 214 and the inner rolling surface 222 formed on the threaded shaft 213, and balls 221 are interposed in the rolling passage. In FIG. 13, the balls 221 located on the front side of the drawing paper in the threaded shaft 213 are not illustrated. The balls 221 support the nut 212 with respect to the threaded shaft 213, and roll in the rolling passage to move the nut 212 in the axis direction by the rotating of the threaded shaft 213 relative to the nut 212.

The balls 221 move spirally and move relative to the nut 212 in the direction opposite to the direction in which the nut 212 moves relative to the threaded shaft 213. When the balls 221 reach an end of the rolling passage, and the balls 221 is deflected from the spiral raceway of the rolling passage so as to go into a ball circulation passage, not illustrated, by a ball circulation mechanism disposed in the nut 212, not illustrated. A ball 221 is pushed by a following ball 221 in the ball circulation passage so as to move relative to the nut 212 in the same direction as the direction in which the nut 212 moves relative to the threaded shaft 213, returns to the rolling passage, and rolls in the rolling passage, and this circulation is repeated. Examples of the type of the circulation mechanism include an end deflector type, a tube type, a piece type, and an end cap type.

The nut 212 is provided with a lubricant supply mechanism, not illustrated, for supplying a lubricant to the rolling passage.

It is preferable that an appropriate pre-load be given among the nut 212, the threaded shaft 213, and the balls 221. An over-ball pre-load, an integral pre-load, a double-nut pre-load, and the like can be used as the pre-load.

Figure 14A:
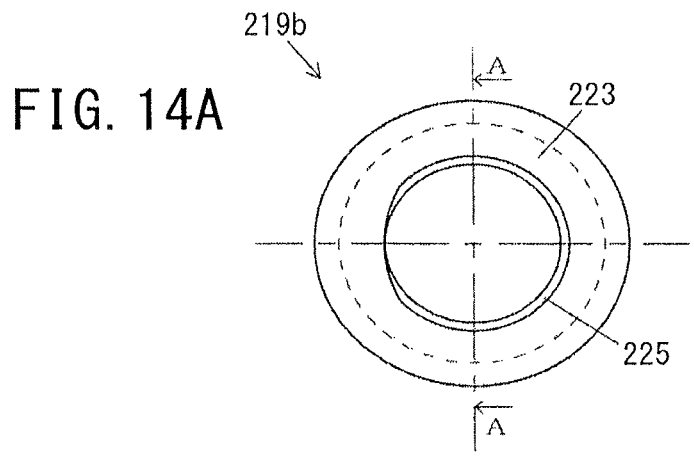
FIG. 14A is a plain view of a dust-proof component used for the ball screw apparatus according to the first embodiment of the sixth and seventh aspects.
Figure 14B:
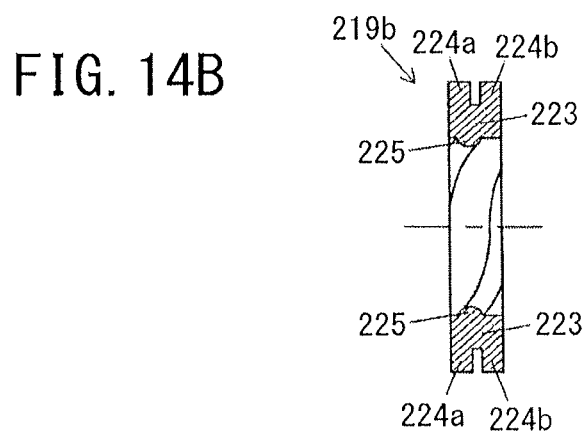
FIG. 14B is a cross-sectional view of the dust-proof component used for the ball screw apparatus according to the first embodiment of the sixth and seventh aspects, taken along line A-A of FIG. 14A.
Figure 14C:
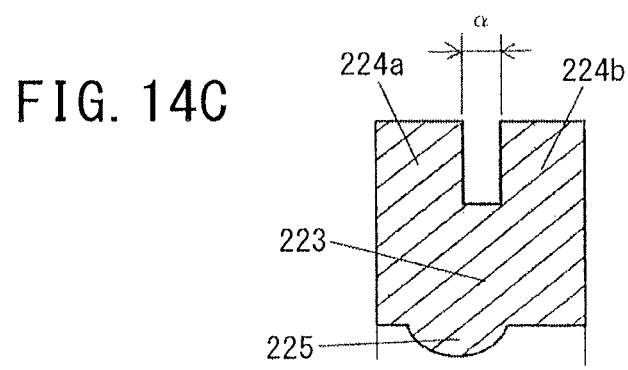
FIG. 14C is an enlarged cross-sectional view of the dust-proof component used for the ball screw apparatus according to the first embodiment of the sixth and seventh aspects.

FIGS. 14A to 14C show a plan view and a cross-sectional view illustrating the dust-proof component 219b. FIG. 14A is a plan view of the dust-proof component 219b used in the ball screw apparatus according to the first embodiment, where the outer circumferential surface of the main body 223 thereof is indicated by a dotted line. FIG. 14B is a cross-sectional view taken along line A-A of FIG. 14A. FIG. 14C is an enlarged cross-sectional view of the dust-proof component 219b.

As illustrated in FIGS. 14A to 14C, the dust-proof component 219b includes a toroidal main body 223 formed inside in the radial direction, a seal lip 225 formed on the inner circumference side of the main body 223, and a pair of screw-receiving protrusions 224a and 224b protruding outward in the radial direction from the outer circumferential surface of the main body 223 and extending in the circumferential direction. The size of the dust-proof component 219b in the axis direction is smaller than the depth of the spigot joint portion 217b in the axis direction, the spigot joint portion 217b being formed in the nut 212, and the outer diameter of the dust-proof component 219b is slightly smaller than the inner diameter of the spigot joint portion 217b.

The seal lip 225 is a portion spirally protruding inward in the radial direction to correspond to the spiral raceway of the inner rolling surface 222 of the threaded shaft 213 and is formed as a unified body with the main body 223. The seal lip 225 has a shape corresponding to the inner rolling surface 222 and prevents the entry of foreign matters into the nut 212 from the inner rolling surface 222 or the leakage of the lubricant from the nut 212. The portion other than the seal lip 225 on the inner circumferential surface of the main body 223 has a shape corresponding to the outer circumferential surface other than the inner rolling surface 222 of the threaded shaft 213 and prevents the entry of foreign matters or the leakage of the lubricant.

As illustrated in FIG. 14C, the screw-receiving protrusions 224a and 224b are arranged in the axis direction with a gap therebetween on the outer circumferential surface of the main body 223. Accordingly, the tapping screw 220b is screwed into the gap between the screw-receiving protrusions 224a and 224b to fix the dust-proof component 219b to the nut 212.

As illustrated in FIG. 14A, by forming the pair of screw-receiving protrusions over the entire circumference of the outer circumferential surface of the main body 223, it is possible to match the positions of the seal lip 225 and the spiral raceway of the inner rolling surface 222 of the threaded shaft 213 depending on actual members to be used as described later, so as to fix the dust-proof component. As illustrated in FIG. 14C, the sizes of the screw-receiving protrusions 224a and 224b in the axis direction are identical, and the gap therebetween is formed at the center in the axis direction of the dust-proof component 219b. The sizes of the screw-receiving protrusions 224a and 224b in the axis direction may be different from each other and the gap therebetween may not be formed at the center in the axis direction of the dust-proof component 219b.

It is preferable that the width a of the gap between the screw-receiving protrusions 224a and 224b in the axis direction illustrated in FIG. 14C be equal to or less than the root diameter of the male screw portion of the tapping screw 220b. Accordingly, it is possible to obtain a sufficient fixing force.

The screw-receiving protrusions 224a and 224b are used to fix the tapping screw 220b and are also used to fill the gap between the main body 223 and the spigot joint portion 217b and to prevent the entry of foreign matters into the nut 212. In the surface of the dust-proof component 219b on the center side of the nut 212, a surface perpendicular to the axis direction is formed by the main body 223 and the screw-receiving protrusion 224a. In the surface of the dust-proof component 219b on the side opposite to the center of the nut 212, a surface perpendicular to the axis direction is formed by the main body 223 and the screw-receiving protrusion 224b.

In the outer circumferential surface of the dust-proof component 219b, the screw-receiving protrusions 224a and 224b forma circumferential surface parallel to the axis direction. The dust-proof component 219b can be manufactured by machining, or resin molding such as injection molding. In the resin molding, by forming a portion for molding the gap between the screw-receiving protrusions 224a and 224b in a mold, it is possible to manufacture the dust-proof component without an increase in cost. In the case of machining, by forming a groove during manufacturing the dust-proof member 219b, it is possible to manufacture the dust-proof component with decreased costs, compared with a case where a pilot hole is formed at the time of assembling the entirety of the ball screw apparatus.

The dust-proof component 219*b* is described above, and the dust-proof component 219*a* has the same configuration, which provides the same operations and advantages.

Attachment of the dust-proof component 219*b* to the nut 212 in manufacturing the ball screw apparatus 211 according to the first embodiment will be described below with reference to FIGS. 15A to 15C.

Figure 15A:
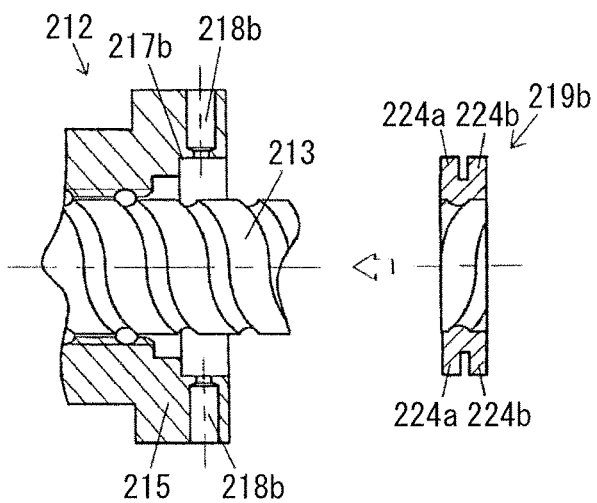
FIG. 15A is a cross-sectional view illustrating a step of fitting the dust-proof component to an end portion of the nut out of steps of attaching a dust-proof component to the ball screw apparatus according to the first embodiment of the sixth and seventh aspects.

First, as illustrated in FIG. 15A, by causing an end portion of the threaded shaft 213 to pass through the dust-proof component 219*b* and rotating the dust-proof component 219*b* while pressing the dust-proof component 219*b* in the axis direction of the threaded shaft 213, the dust-proof component 219*b* moves to the nut 212 over the threaded shaft 213 and is fitted into the spigot joint portion 217*b*.

Figure 15B:
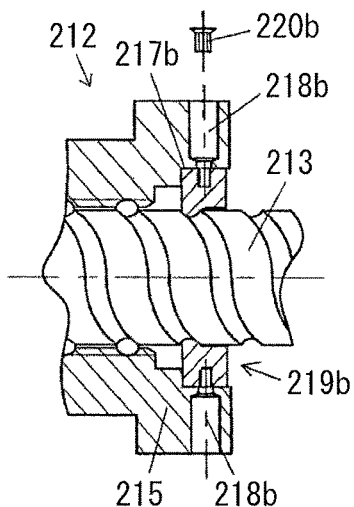
FIG. 15B is a cross-sectional view illustrating a step of fixing the dust-proof component to the nut using a tapping screw out of the steps of attaching a dust-proof component to the ball screw apparatus according to the first embodiment of the sixth and seventh aspects.

Then, as illustrated in FIG. 15B, the tapping screw 220*b* is inserted into the screw hole portion 218*b* formed in the flange 215 and is screwed into the gap between the screw-receiving protrusions 224*a* and 224*b* of the dust-proof component 219*b*.

Figure 15C:
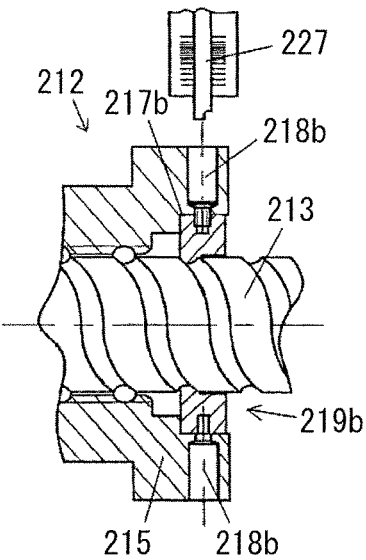
FIG. 15C is a cross-sectional view illustrating a step of checking a fixed state of the tapping screw using a caliper out of the steps of attaching a dust-proof component to the ball screw apparatus according to the first embodiment of the sixth and seventh aspects.

Finally, as illustrated in FIG. 15C, the depth from the outer circumferential surface of the flange 215 to the tapping screw 220*b* is measured with a caliper 227, the fixation state of the tapping screw 220*b* is checked, and then the attachment operation is finished. In this way, according to the present invention, since it is not necessary to form a pilot hole into which the tapping screw is inserted and thus shavings due to the forming of the pilot hole are not generated, it is not necessary to remove the shavings and it is thus possible to exclude a possibility that the shavings will enter between the pilot hole and the tapping screw.

Second Embodiment

A dust-proof member according to a second embodiment of the sixth and seventh aspects will be described below with reference to FIGS. 16A to 16C. A ball screw apparatus using the dust-proof member according to this embodiment has the same configuration as in the first embodiment of the sixth and seventh aspects.

Figure 16A:
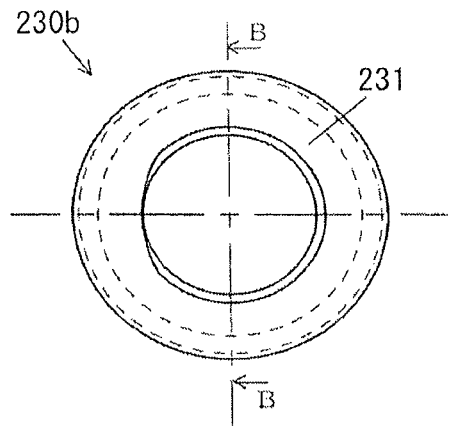
FIG. 16A is a plain view of a dust-proof component used for a ball screw apparatus according to a second embodiment of the sixth and seventh aspects.
Figure 16B:
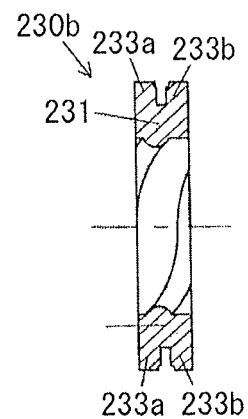
FIG. 16B is a cross-sectional view of the dust-proof component used for the ball screw apparatus according to the second embodiment of the sixth and seventh aspects taken along line B-B of FIG. 16A.

FIG. 16A is a plan view of a dust-proof component 230*b* according to the second embodiment, where the outer circumferential surface of a main body 231 and diameter-decreasing stepped portions 232*a* and 232*b* of the dust-proof component 230*b* are indicated by dotted lines. FIG. 16B is a cross-sectional view taken along line B-B of FIG. 16A. FIG. 16C is an enlarged cross-sectional view of the dust-proof component 230*b*.

Figure 16C:
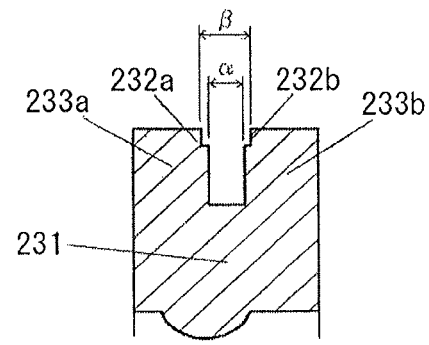
FIG. 16C is an enlarged cross-sectional view of the dust-proof component used for the ball screw apparatus according to the second embodiment of the sixth and seventh aspects.

In the dust-proof component 230*b* according to this embodiment, as illustrated in FIG. 16C, diameter-decreasing stepped portions 232*a* and 232*b* of which the diameter decreases from the outer circumferential surface of the dust-proof component 230*b* are formed at the outside end portions of the facing surfaces of the a pair of screw-receiving protrusions 233*a* and 233*b* in the radial direction, respectively. Accordingly, the opening into which the tapping screw inserts is broadened in the axis direction such that the tapping screw bites into the opening more easily and it is possible to more easily attach the dust-proof component.

When the outer diameter of the male screw portion of the tapping screw is d1, the root diameter of the male screw portion of the tapping screw is d2, the width of a narrow portion in the axis direction is α, the narrow portion being formed inside in the radial direction out of the gaps formed between the screw-receiving protrusions 233*a* and 233*b*, and the width of a broad portion in the axis direction is β, the broad portion being formed outside in the radial direction, it is preferable that Conditional Expressions (1) and (2) be satisfied.

$$\alpha \leq d2 \tag{1}$$

$$d2 < \beta \leq d1 \tag{2}$$

Accordingly, it is possible to facilitate the tapping screw to bite into the gap and to obtain a sufficient fixing force using the tapping screw.

Third Embodiment

A dust-proof member according to a third embodiment of the sixth and seventh aspects will be described below with reference to FIGS. 17A to 17C. A ball screw apparatus using the dust-proof member according to this embodiment has the same configuration as in the first embodiment of the sixth and seventh aspects.

Figure 17A:
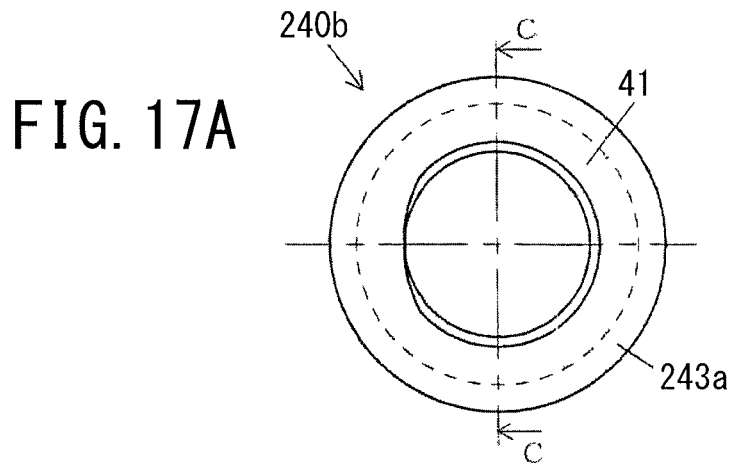
FIG. 17A is a plain view of a dust-proof component used for a ball screw apparatus according to a third embodiment of the sixth and seventh aspects.
Figure 17B:
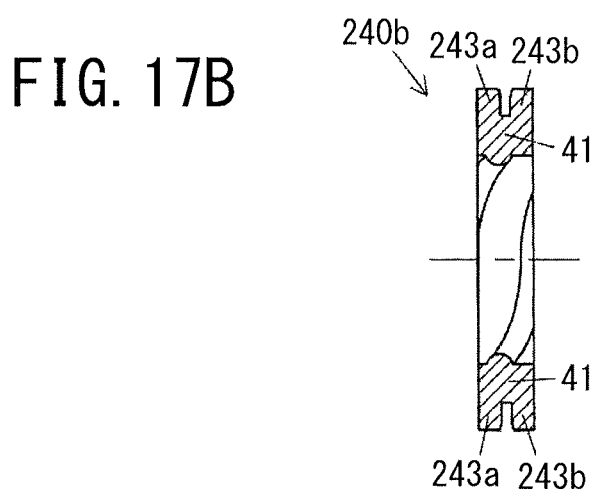
FIG. 17B is a cross-sectional view of the dust-proof component used for the ball screw apparatus according to the third embodiment of the sixth and seventh aspects taken along line C-C of FIG. 17A.

FIG. 17A is a plan view of a dust-proof component 240*b* according to this embodiment, where the outer circumferential surface of a main body 241 of the dust-proof component 240*b* is indicated by a dotted line. FIG. 17B is a cross-sectional view taken along line C-C of FIG. 17A. FIG. 17C is an enlarged cross-sectional view of the dust-proof component 240*b*.

Figure 17C:
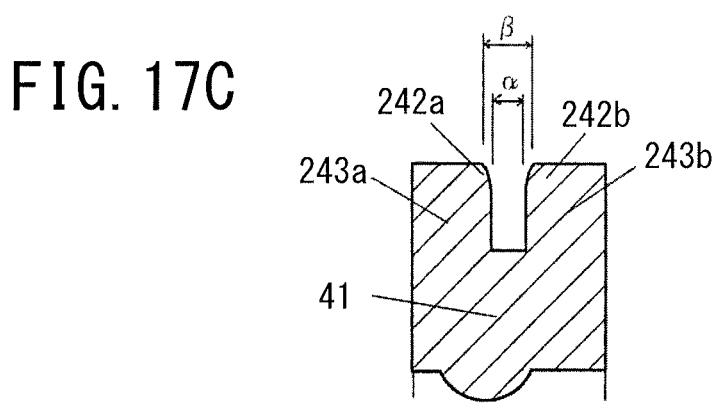
FIG. 17C is an enlarged cross-sectional view of the dust-proof component used for the ball screw apparatus according to the third embodiment of the sixth and seventh aspects.

In the dust-proof component 240*b* according to this embodiment, as illustrated in FIG. 17C, rounded portions 242*a* and 242*b* which has an arc-like shape are formed at the outside end portions of the facing surfaces of the a pair of screw-receiving protrusions 243*a* and 243*b* in the radial direction, respectively, so as to increase a gap outside in the radial direction. Accordingly, the opening to which the tapping screw inserts is broadened in the axis direction such that the tapping screw bites into the opening more easily, and it is possible to more easily attach the dust-proof component 240*b*.

When the outer diameter of the male screw portion of the tapping screw is d1, the root diameter of the male screw portion of the tapping screw is d2, the width of a narrow portion in the axis direction is α, the narrow being formed inside in the radial direction out of the gaps formed between the screw-receiving protrusions 243*a* and 243*b*, and the width of a broadest portion in the axis direction is β, the broadest portion being formed on the outermost side in the radial direction, it is preferable that Conditional Expressions (1) and (2) be satisfied.

$$\alpha \leq d2 \tag{1}$$

$$d2 < \beta \leq d1 \tag{2}$$

Accordingly, it is possible to facilitate the tapping screw to bite into the gap and to obtain a sufficient fixing force using the tapping screw.

Fourth Embodiment

A dust-proof member according to a fourth embodiment of the sixth and seventh aspects will be described below with reference to FIGS. 18A to 18C. A ball screw apparatus using the dust-proof member according to this embodiment has the same configuration as in the first embodiment of the sixth and seventh aspects.

Figure 18A:
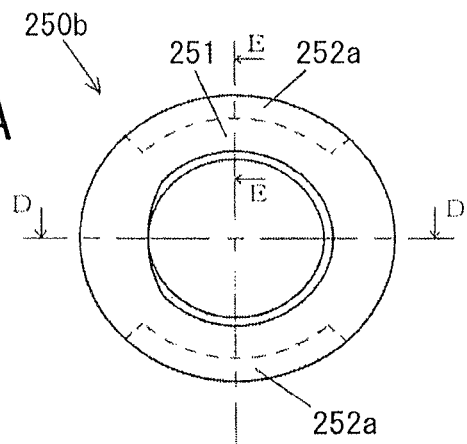
FIG. 18A is a plain view of a dust-proof component used for a ball screw apparatus according to a fourth embodiment of the sixth and seventh aspects.
Figure 18B:
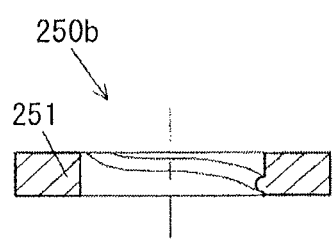
FIG. 18B is a cross-sectional view of the dust-proof component used for the ball screw apparatus according to the fourth embodiment of the sixth and seventh aspects taken along line D-D of FIG. 18A.
Figure 18C:
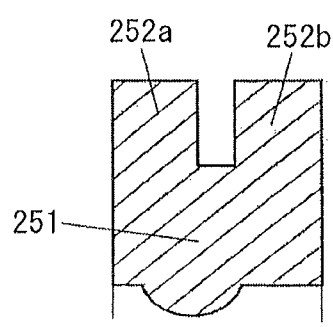
FIG. 18C is an enlarged cross-sectional view of the dust-proof component used for the ball screw apparatus according to the fourth embodiment of the sixth and seventh aspects.

FIG. 18A is a plan view of a dust-proof component 250*b* used in the ball screw apparatus according to this embodiment, where the boundary between a screw-receiving protrusion 252*a* and a main body 251 is indicated by a dotted line. FIG. 18B is a cross-sectional view taken along line D-D of FIG. 18A. FIG. 18C is a cross-sectional view taken along line E-E of FIG. 18A.

In the dust-proof component 250b according to this embodiment, as illustrated in FIG. 18A, screw-receiving protrusions 252a and 252b are formed at only a part of the outer circumferential surface of the main body 251. In a part at which the screw-receiving protrusions 252a and 252b are not formed, the main body 251 extends outside in the radial direction so that the outside surface thereof in the radial direction and the outside surfaces of the screw-receiving protrusions 252a and 252b in the radial direction are formed in the same circumferential surface, as illustrated in FIG. 18B.

As describe above, the screw-receiving protrusions 252a and 252b are not formed over the entire circumference, the screw-receiving protrusions 252a and 252b may be arranged in only a necessary range in the vicinity of the part into which a screw is screwed in design, in consideration at the time of design for the attachment direction and manufacturing accuracy of the dust-proof component 250b. In this case, similarly to the first to third embodiments of the sixth and seventh aspects, it is possible to easily attach the dust-proof component.

Embodiments of Eighth and Ninth Aspects

First Embodiment

Figure 19A:
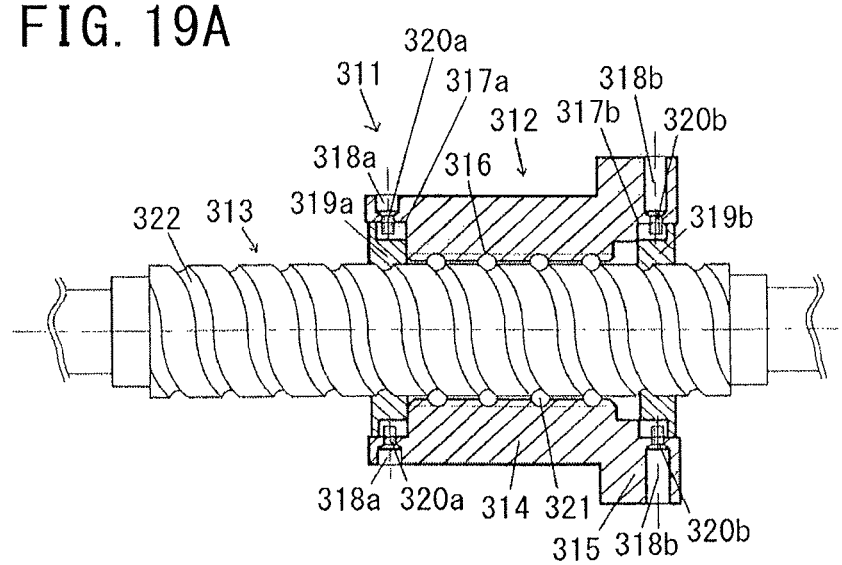
FIG. 19A is a diagram illustrating a cross-section of a nut cut in an axis direction and a side surface of a threaded shaft of a ball screw apparatus according to a first embodiment of the eighth and ninth aspects.

A first embodiment of the eighth and ninth aspects will be described below with reference to FIGS. 19A to 19C, 20A to 20C, 21A to 21C and 22. FIG. 19A illustrates a ball screw apparatus 311 according to this embodiment, where a cross-section of a nut 312 cut in the axis direction thereof and a lateral surface of a threaded shaft 313 are illustrated.

The ball screw apparatus 311 according to this embodiment includes a nut 312, a threaded shaft 313 inserted into the nut 312, and plural balls 321 interposed between the nut 312 and the threaded shaft 313.

The nut 312 includes a cylindrical portion 314 formed of metal and having a cylindrical shape and a flange 315 formed of metal as a unified body with the cylindrical portion 314 and having an outer diameter larger than that of the cylindrical portion at an end of the cylindrical portion in the axis direction.

An outer rolling surface 316 having a spiral shape is formed on the inner circumferential surface of the cylindrical portion 314, and a spigot joint portion 317a is formed in an end portion opposite to the flange 315. The cross-sectional shape of the outer rolling surface 316 is a gothic arc shape. The spigot joint portion 317a includes an inner circumferential surface having a cylindrical shape parallel to the axis direction and a surface formed inside the nut and perpendicular to the axis direction.

In a cylindrical portion forming the inner circumferential surface of the spigot joint portion 317a at an end portion opposite to the flange 315 of the cylindrical portion 314, screw hole portions 318a penetrating the cylindrical portion in the radial direction are formed. The screw hole portions 318a are disposed at two positions facing each other in the radial direction. Each of the screw hole portions 318a includes a counter boring portion formed outside in the radial direction and a female screw portion formed inside in the radial direction from the counter boring portion.

A toroidal dust-proof component 319a formed of elastomer is fitted into the spigot joint portion 317a and is fixed to the cylindrical portion 314 with a tapping screw 320a.

A spigot joint portion 317b is also formed in an end portion of the flange 315 in the axis direction. The spigot joint portion 317b includes a circumferential surface having a cylindrical shape parallel to the axis direction and a surface formed inside the nut and perpendicular to the axis direction. In a toroidal cylindrical portion forming the portion on the outer side of the spigot joint portion 317b in the radial direction, screw hole portions 318b penetrating the cylindrical portion in the radial direction are formed. The screw hole portions 318b are disposed at two positions facing each other in the radial direction.

Each of the screw hole portions 318b includes a counter boring portion formed outside in the radial direction and a female screw portion formed inside in the radial direction from the counter boring portion. The depth in the radial direction of the counter boring portion formed in the screw hole portion 318b is larger than that of the screw hole portion 318a by the thickness of the flange 315 in the radial direction. The number of screw hole portions 318a and 318b are not limited to two, but the screw hole portions may be formed at three or more positions if necessary.

The toroidal dust-proof component 319b formed of elastomer is fitted into the spigot joint portion 317b, and is fixed to the spigot joint portion 317b with a tapping screw 320b. By setting the shapes and the sizes of the spigot joint portions 317a and 317b to be equal to each other, the dust-proof components 319a and 319b having the same shape and size can be manufactured and used for both spigot joint portions 317a and 317b by inverting the assembling direction. In the present invention, the dust-proof components 319a and 319b may be formed of elastic materials other than elastomer. The dust-proof components 319a and 319b may include a metal core so as to maintain the shape and to enhance strength.

An inner rolling surface 322 having a spiral shape and facing the outer rolling surface 316 formed on the inner circumferential surface of the cylindrical portion 314 is formed on the outer circumferential surface of the threaded shaft 313. The cross-sectional shape of the inner rolling surface 322 is a substantially arc shape and is a shape in which a clearance groove, not illustrated, is formed on the bottom thereof. In order to enhance sealing performance, a configuration not having the clearance groove may be employed.

A rolling passage is formed by the outer rolling surface 316 formed on the inner circumferential surface of the cylindrical portion 314 and the inner rolling surface 322 formed on the threaded shaft 313, and balls 321 are interposed in the rolling passage. In FIG. 19A, the balls 321 located on the front side of the drawing paper in the threaded shaft 313 are not illustrated. The balls 321 support the nut 312 with respect to the threaded shaft 313, and roll in the rolling passage to move the nut 312 in the axis direction by rotating of the threaded shaft 313 relative to the nut 312.

The balls 321 move spirally and move relative to the nut 312 in the direction opposite to the direction in which the nut 312 moves relative to the threaded shaft 313. When the balls reach an end of the rolling passage, the balls are deflected from the spiral raceway of the rolling passage so as to go into a ball circulation path, not illustrated, by a ball circulation mechanism, not illustrated, disposed in the nut 312. A ball 321 is pushed by a following ball 321 in the ball circulation passage so as to move relative to the nut 312 in the same direction as the direction in which the nut 312 moves relative to the threaded shaft 313, returns to the rolling passage, and rolls in the rolling passage, and this circulation is repeated.

Examples of the type of the circulation mechanism include an end deflector type, a tube type, a piece type, and an end cap type.

The nut 312 is provided with a lubricant supply mechanism, not illustrated, for supplying a lubricant to the rolling passage.

It is preferable that an appropriate pre-load be given among the nut 312, the threaded shaft 313, and the balls 321. An over-ball pre-load, an integral pre-load, a double-nut pre-load, and the like can be used as the pre-load.

Figure 19B:
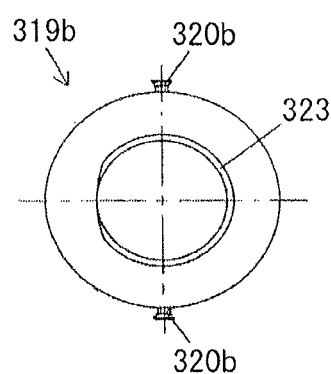
FIG. 19B is a plan view illustrating a state where a tapping screw is screwed into the dust-proof component in the ball screw apparatus according to the first embodiment of the eighth and ninth aspects, when viewed from the outside of the nut in the axis direction.

FIG. 19B is a plan view illustrating a state where the tapping screws 320b are inserted into the dust-proof component 319b according to the first embodiment when viewed from the outside of the nut 312 in the axis direction. The outside surface in the axis direction of the nut 312 is an annular smooth surface and the tapping screws 320b are screwed into the surface from up and down on at the back side of FIG. 19B.

Figure 19C:
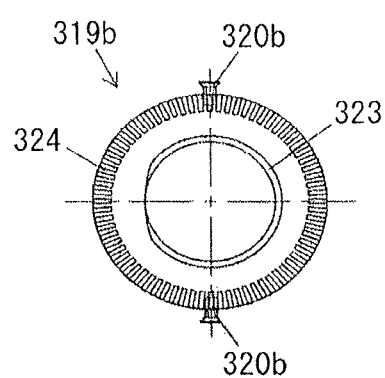
FIG. 19C is a plan view illustrating a state where the tapping screw is screwed into the dust-proof component in the ball screw apparatus according to the first embodiment of the eighth and ninth aspects, when viewed from the inside of the nut in the axis direction.

FIG. 19C is a plan view illustrating a state where the tapping screws are screwed into the dust-proof component 319b according to this embodiment when viewed from the inside of the nut 312 in the axis direction. The tapping screws 320a and 320b are screwed into the gap between the screw-receiving protrusions 324 formed in a radial shape outside of the dust-proof component 319a in the radial direction.

Figure 20A:
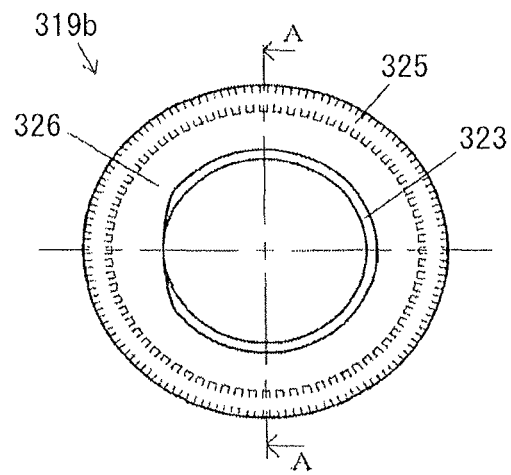
FIG. 20A is a plain view of a dust-proof component used for the ball screw apparatus according to the first embodiment of the eighth and ninth aspects.
Figure 20B:
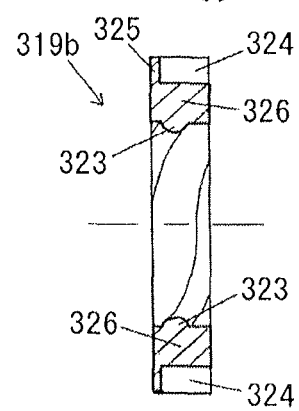
FIG. 20B is a cross-sectional view of the dust-proof component used for the ball screw apparatus according to the first embodiment of the eighth and ninth aspects taken along line A-A of FIG. 20A.
Figure 20C:
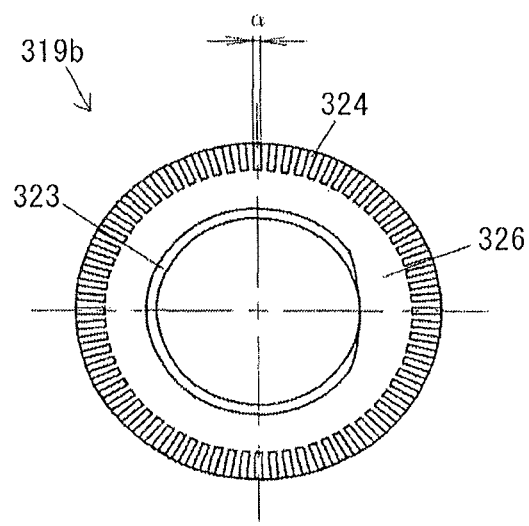
FIG. 20C is a plan view illustrating a surface on the side on which the screw-receiving protrusions are formed.

FIGS. 20A to 20C include a plan view and a cross-sectional view illustrating the dust-proof component 319b. FIG. 20A is a plan view illustrating a surface on a flat side. The screw-receiving protrusions 324 formed on the back side of the drawing are indicated by dotted lines. FIG. 20B is a cross-sectional view taken along line A-A of FIG. 20A. FIG. 20C is a plan view illustrating a surface on the side on which the screw-receiving protrusions 324 are formed.

As illustrated in FIGS. 20A to 20C, the dust-proof component 319b includes a toroidal main body 326 formed inside in the radial direction, a seal lip 323 formed on the inner circumference side of the main body 326, plural screw-receiving protrusions 324 protruding outward in the radial direction from the outer circumferential surface of the main body 326 and extending in the axis direction, and a shielding portion 325 protruding outward in the radial direction from the outer circumferential surface of the main body 326, extending in the circumferential direction, and being disposed at ends of gaps between the screw-receiving protrusion 324 and the screw-receiving protrusion 324. The size of the dust-proof component 319b in the axis direction is smaller than the depth of the spigot joint portion 317b in the axis direction, the spigot joint portion 317b being formed in the nut 312, and the outer diameter of the dust-proof component 319b is slightly smaller than that of the spigot joint portion.

The seal lip 323 is a portion spirally protruding inward in the radial direction to correspond to the spiral raceway of the inner rolling surface 322 of the threaded shaft 313 and is formed as a unified body with the main body 326. The seal lip 323 has a shape corresponding to the inner rolling surface 322 and prevents the entry of the foreign matters into the nut 312 from the inner rolling surface 322 or the leakage of the lubricant from the nut 312. The portion other than the seal lip 323 on the inner circumferential surface of the main body 326 has a shape corresponding to the outer circumferential surface other than the inner rolling surface 322 of the threaded shaft 313 and prevents the entry of the foreign matters or the leakage of the lubricant.

As illustrated in FIG. 20C, the plural screw-receiving protrusions 324 are arranged with a gap therebetween on the outer circumferential surface of the main body 326. Accordingly, the tapping screw 320b is screwed into the gap between the screw-receiving protrusions 324 to fix the dust-proof component 319b to the nut 312. As illustrated in FIG. 20C, by forming the plural screw-receiving protrusions 324 on the outer circumferential surface of the main body 326 and forming the plural gaps therebetween, the seal lip 323 can be arranged so as to match the positions of the seal lip 32 and the spiral raceway of the inner rolling surface 322 of the threaded shaft 313 depending on actual members to be used. The number and the size of the screw-receiving protrusions 324 are not limited to the those illustrated in FIG. 20C, and may be set to an appropriate number and an appropriate size depending on the size or material of the dust-proof component 319b, the size of the tapping screw 320b, and the like.

It is preferable that the size a of the gap between the screw-receiving protrusions 324 in the circumferential direction illustrated in FIG. 20C be equal to or less than the root diameter of the male screw portion of the tapping screw 320b. Accordingly, it is possible to obtain a sufficient fixing force. When the screws are fastened at positions facing each other in the radial direction as in the first embodiment, it is preferable that the screw-receiving protrusions 324 be disposed to face each other in the radial direction. Accordingly, the gaps between the screw-receiving protrusions 324 face each other in the radial direction and thus the screws can be easily fastened at the positions facing each other in the radial direction.

The protruding amount of the shielding portion 325 outward in the radial direction from the outer circumferential surface of the main body 326 is equal to that of the screw-receiving protrusions 324, and covers the end of the gap between the screw-receiving protrusion 324 and the screw-receiving protrusion 324 in the axis direction. Accordingly, it is possible to prevent the entry of the foreign matters into the nut 312 from the gaps between the screw-receiving protrusions 324.

The shielding portion 325 is formed as a unified body with the screw-receiving protrusions 324, and suppresses elastic deformation of the screw-receiving protrusions 324 on both sides of the tapping screw to be separated from each other when the tapping screw is inserted into the gap between the screw-receiving protrusions 324, thereby providing a sufficient fixing force based on the tapping screw 320b.

On the side of the dust-proof component 319b facing the central portion of the nut 312, a surface perpendicular to the axis direction is formed by the main body 326 and the screw-receiving protrusions 324. On the side of the dust-proof component 319b opposite to the central portion of the nut 312, a surface perpendicular to the axis direction is formed by the main body 326 and the shielding portion 325. On the outer circumferential surface of the dust-proof component 319b, a surface parallel to the axis direction is formed by the screw-receiving protrusions 324 and the shielding portion 325. The dust-proof component 319b can be manufactured by injection-molding elastomer.

While the dust-proof component 319b is described above, the dust-proof component 319a has the same shape and provides the same operations and advantages.

Attachment of the dust-proof component 319b to the nut 312 in manufacturing the ball screw apparatus 311 according to this embodiment will be described below with reference to FIGS. 21A to 21C.

Figure 21A:
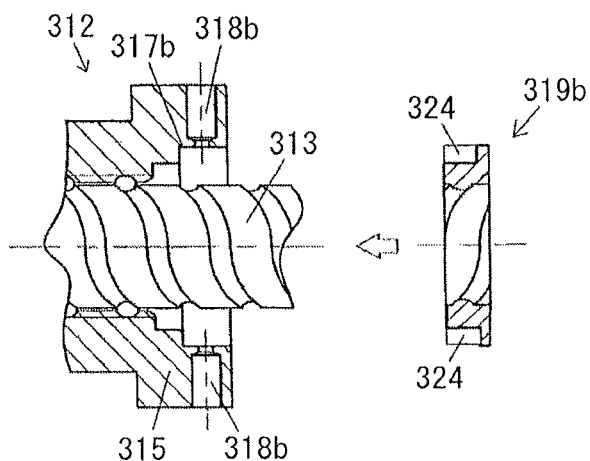
FIG. 21A is a cross-sectional view illustrating a step of fitting the dust-proof component to an end portion of the nut out of steps of attaching a dust-proof component to the ball screw apparatus according to the first embodiment of the eighth and ninth aspects.

First, as illustrated in FIG. 21A, by causing an end portion of the threaded shaft 313 to pass through the dust-proof component 319b and rotating the dust-proof component 319b while pressing the dust-proof component 319b in the axis direction of the threaded shaft 313, the dust-proof component 319b moves to the nut 312 over the threaded shaft 313 and is fitted into the spigot joint portion 317b.

Figure 21B:
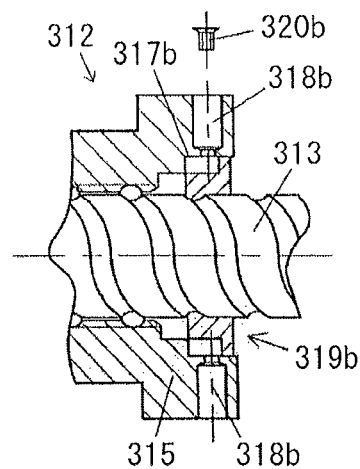
FIG. 21B is a cross-sectional view illustrating a step of fixing the dust-proof component to the nut using a tapping screw out of the steps of attaching the dust-proof component to the ball screw apparatus according to the first embodiment of the eighth and ninth aspects.

Then, as illustrated in FIG. 21B, the tapping screw 320b is inserted into the screw hole portion 318b formed in the flange 315 and is screwed into the gap between the screw-receiving protrusions 324 of the dust-proof component 319b.

Figure 21C:
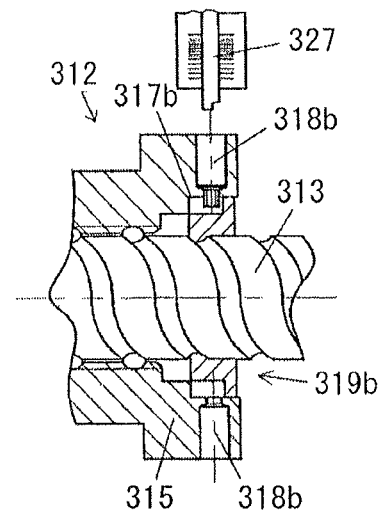
FIG. 21C is a cross-sectional view illustrating a step of checking a fixed state of the tapping screw using a caliper out of the steps of attaching the dust-proof component to the ball screw apparatus according to the first embodiment of the eighth and ninth aspects.

Finally, as illustrated in FIG. 21C, the depth from the outer circumferential surface of the flange 315 to the tapping screw 320b is measured with a caliper 327, the fixation state of the tapping screw 320b is checked, and then the attachment operation is finished. In this way, according to the present invention, since it is not necessary to form a pilot hole into which the tapping screw is inserted and thus shavings due to the forming the pilot hole are not generated, it is not necessary to remove the shavings and it is thus possible to exclude a possibility that the shavings will intrude between the pilot hole and the tapping screw.

When the tip of the tapping screw 320b comes in contact with the outside surfaces of the screw-receiving protrusions 324 in the radial direction and is not inserted any more at the time of inserting the tapping screw 320b into the gap between the screw-receiving protrusions 324, the dust-proof component 319b has only to be rotated in the circumferential direction relative to the nut 312. Accordingly, the tip of the tapping screw 320b can avoid the outside surfaces of the screw-receiving protrusions 324 in the radial direction and can be inserted into the gap between the screw-receiving protrusions 324.

Figure 22:
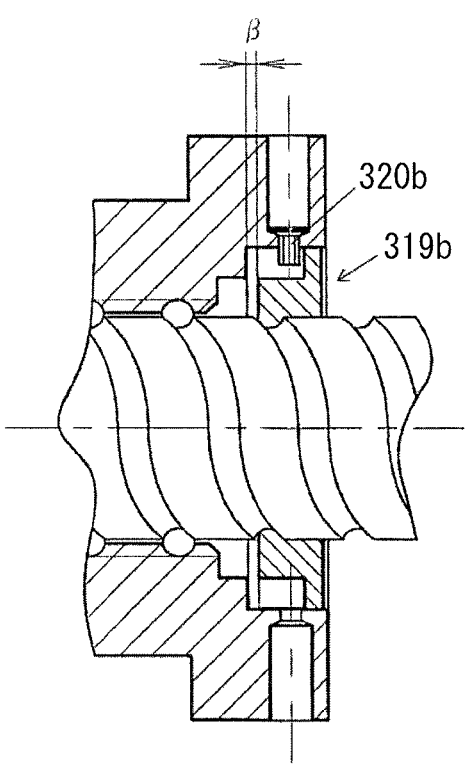
FIG. 22 is a cross-sectional view illustrating a gap in the axis direction between the spigot joint portion of the nut and the dust-proof component in the ball screw apparatus according to the first embodiment of the eighth and ninth aspects.

When the dust-proof component 319b is rotated in this way, the dust-proof component 319b moves in the axis direction relative to the nut 312. Particularly, when the dust-proof component 319b is fitted and then rotated until coming in contact with the surface of the spigot joint portion 317b perpendicular to the axis direction, a gap is generated between the surface of the spigot joint portion 317b perpendicular to the axis direction and the dust-proof component 319b. However, in this case, the size of the dust-proof component 319b in the axis direction is set to be sufficiently smaller than the depth of the spigot joint portion 317b in the axis direction with respect to the displacement β thereof, as illustrated in FIG. 22, so that the dust-proof component 319b does not protrude from the end face of the nut 5. The gap between the screw-receiving protrusions 324 into which the tapping screw 320b is screwed has a length in the axis direction so as to permit movement in the axis direction.

Second Embodiment

A dust-proof member according to a second embodiment of the eighth and ninth aspects will be described below with reference to FIGS. 23A to 23C. A ball screw apparatus using the dust-proof member according to this embodiment has the same configuration as in the first embodiment of the eighth and ninth aspects.

Figure 23A:
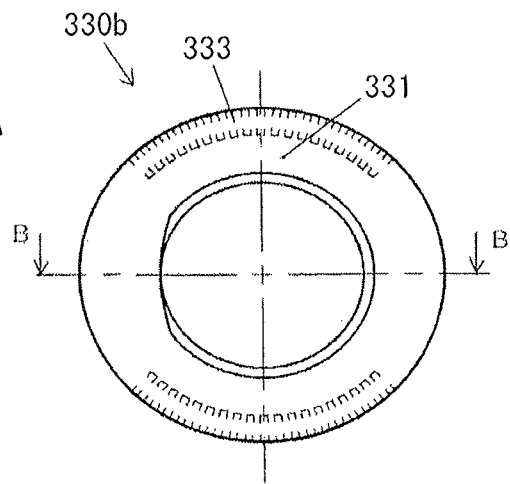
FIG. 23A is a plain view of a dust-proof component used for a ball screw apparatus according to a second embodiment of the eighth and ninth aspects.
Figure 23B:
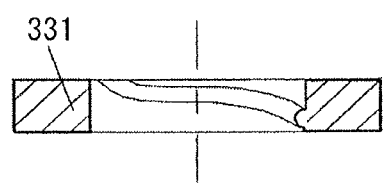
FIG. 23B is a cross-sectional view of the dust-proof component used for the ball screw apparatus according to the second embodiment of the eighth and ninth aspects taken along line B-B of FIG. 23A.
Figure 23C:
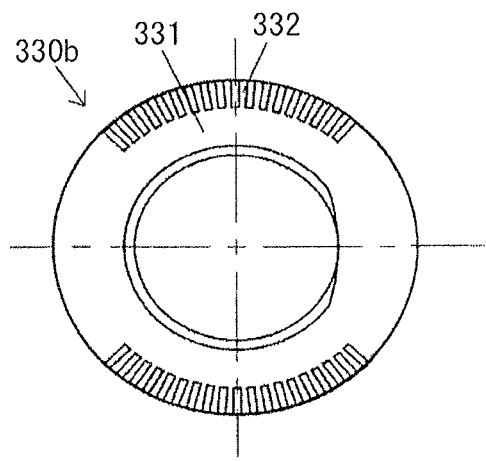
FIG. 23C is a plan view illustrating a surface on the side on which the screw-receiving protrusions are formed.
Figure 24:
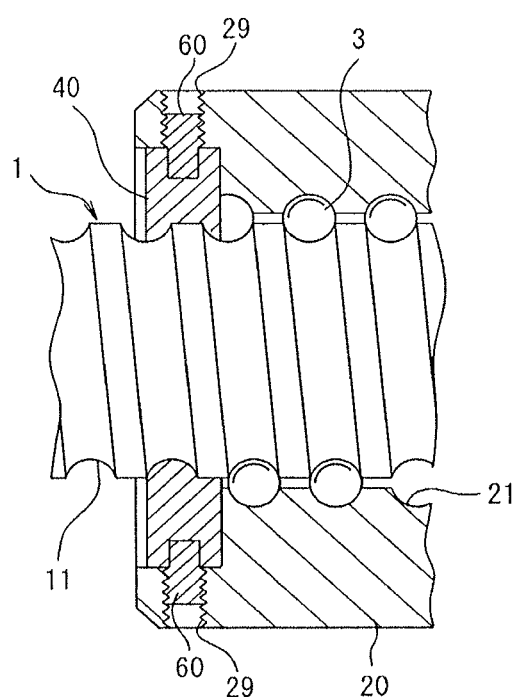
FIG. 24 is a partial cross-sectional view illustrating a conventional example of a ball screw having a seal.
Figure 25A:
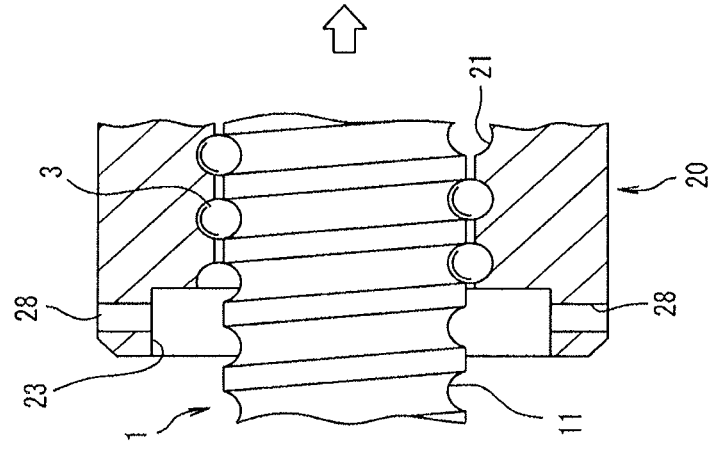
FIGS. 25A to 25C are diagrams illustrating a method of fixing a seal to the ball screw illustrated in FIG. 24.
Figure 25B:
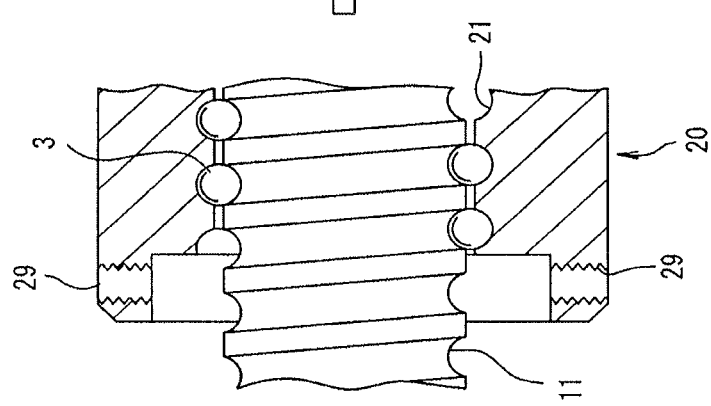
Figure 25C:
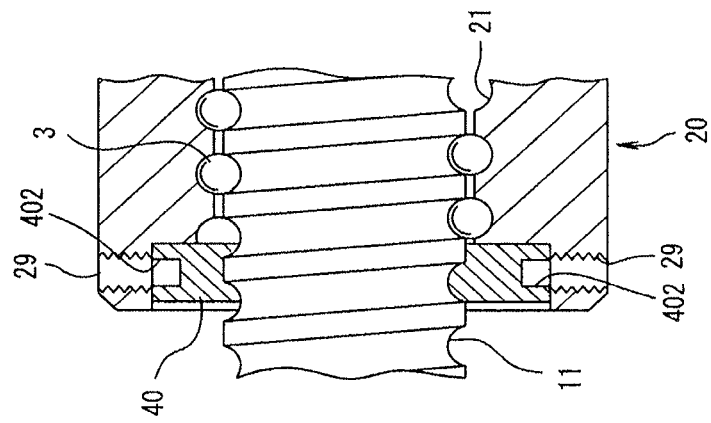
Figure 26A:
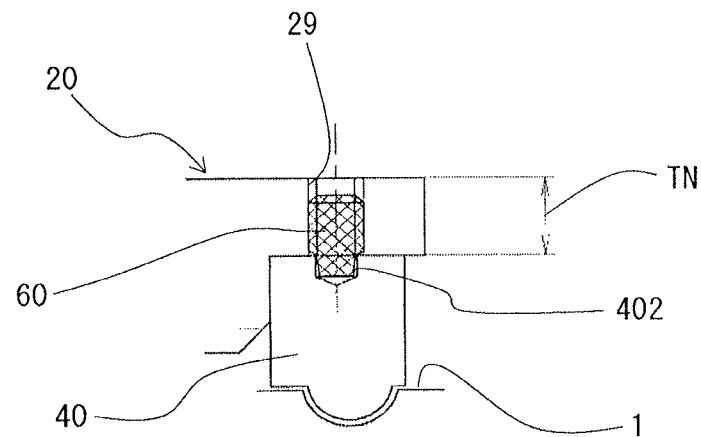
FIG. 26A is a cross-sectional view of a through hole when the wall thickness of a nut is small.
Figure 26B:
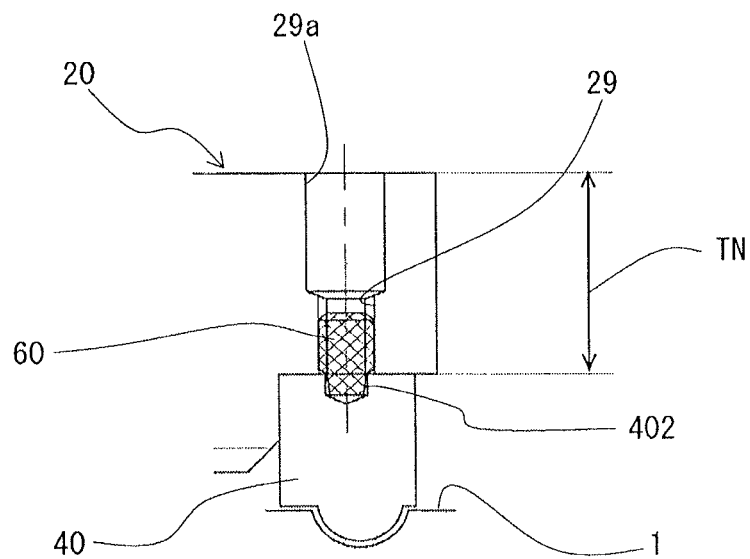
FIG. 26B is a cross-sectional view of the through hole when the wall thickness of the nut is large.

FIG. 23A is a plan view illustrating a surface on a flat side of a dust-proof component 330b used in the ball screw apparatus according to this embodiment, where screw-receiving protrusions 332 formed on the deep side of the drawing are indicated by dotted lines. FIG. 23B is a cross-sectional view taken along line B-B of FIG. 23A. FIG. 23C is a plan view illustrating a surface on a side on which the screw-receiving protrusions 332 are formed.

In the dust-proof component 330b according to this embodiment, as illustrated in FIG. 23A, the screw-receiving protrusions 332 and a shielding portion 333 are formed in only a part of the outer circumferential surface of a main body 331. In a part in which the screw-receiving protrusions 332 are not formed, the main body 331 extends outside in the radial direction so that the outside surface thereof in the radial direction and the outside surfaces of the screw-receiving protrusions 332 in the radial direction are formed in the same circumferential surface, as illustrated in FIGS. 23B and 23C.

As describe above, the screw-receiving protrusions 332 are not formed over the entire circumference, the screw-receiving protrusions 332 may be arranged in only a necessary range in the vicinity of the part into which a screw is screwed in design, in consideration of at the time of design for the attachment direction and manufacturing accuracy of the dust-proof component 330b. In this case, similarly to the first embodiment of the eighth and ninth aspects, it is possible to easily attach the dust-proof component.

REFERENCE SIGNS LIST

1: threaded shaft
11: spiral groove of threaded shaft
2: nut
21: spiral groove of nut
22: flange of nut
23: inner circumferential surface of seal-attaching portion
24: seal-attaching portion
25: through hole of seal-attaching portion
25a: large-diameter portion of through hole
25b: small-diameter portion of through hole
25c: conical portion (bearing face) of through hole
3: ball
4: seal (dust-proof component)
42: concave portion (pilot hole, attachment hole)
5: tapping screw (screw having head)
51: head
6: self-drill screw (screw having head)
61: head

The invention claimed is:

1. A method for manufacturing a ball screw, the method comprising:
a seal fixing step of fixing a ring shaped seal to an attachment portion disposed in an end portion of a nut of the ball screw in an axis direction using a screw having a head; and
a concave portion forming step of forming a concave portion extending in a radial direction from an outer circumferential surface of the ring shaped seal,
wherein the attachment portion has an inner circumferential surface having a diameter larger than a diameter of an inner circumferential surface on which a spiral groove of the nut is formed,
a through hole is formed in the attachment portion, the through hole penetrating the attachment portion in the radial direction from an outer circumferential surface of the attachment portion to the inner circumferential surface of the attachment portion and having a bearing face for bearing the head of the screw,
the through hole includes a large-diameter portion on an outer circumference side, a small-diameter portion on an inner circumference side, and a conical portion communicating between the large-diameter portion and the small-diameter portion,
a diameter of the large-diameter portion is larger than a diameter of the head of the screw, a diameter of the small-diameter portion is larger than an outer diameter of a male screw portion of the screw, an inclined surface of the conical portion serves as the bearing face for bearing the head, the concave portion forming step includes:
  disposing the ring shaped seal in the attachment portion;
  using a drill having a bit portion at a tip of a shank portion of the drill and an inclined surface formed in a boundary portion between the shank portion and the bit portion, the inclined surface corresponding the inclined surface of the through hole, a diameter of the bit portion being smaller than a diameter of the shank portion, the diameter of the shank portion being larger than the diameter of the small-diameter portion of the through hole and smaller than the diameter of the large-diameter portion; and
  forming the concave portion in the ring shaped seal by inserting the drill into the through hole until a position where the inclined surface of the shank portion comes in contact with the inclined surface of the through hole, and the seal fixing step includes matching positions of the attachment hole and the through hole with each other, and passing the screw through the through hole to engage the screw with the attachment hole to exert an outward-directed force in the radial direction on the ring shaped seal because of a force of the head pressing the bearing face to fix the ring shaped seal to the nut.

* * * * *